US006891669B2

(12) United States Patent
Yoneyama et al.

(10) Patent No.: US 6,891,669 B2
(45) Date of Patent: May 10, 2005

(54) MICROSCOPE SYSTEM

(75) Inventors: Takashi Yoneyama, Sagamihara (JP); Tetsuya Shirota, Hachioji (JP); Masato Kanao, Hachioji (JP); Tomohiro Uchida, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/854,566

(22) Filed: May 25, 2004

(65) Prior Publication Data

US 2004/0217259 A1 Nov. 4, 2004

Related U.S. Application Data

(63) Continuation of application No. PCT/JP02/13189, filed on Dec. 17, 2002.

(30) Foreign Application Priority Data

Dec. 17, 2001 (JP) .................................. 2001-383559
Jan. 10, 2002 (JP) .................................. 2002-003825
Mar. 11, 2002 (JP) .................................. 2002-065791

(51) Int. Cl.[7] .............................................. G02B 21/06
(52) U.S. Cl. ........................ 359/385; 359/363; 359/380
(58) Field of Search ................................ 359/363, 368, 359/379, 380, 385, 388, 389

(56) References Cited

U.S. PATENT DOCUMENTS 4,136,950 A * 1/1979 Labrum et al. ............... 356/28
5,252,834 A * 10/1993 Lin ........................... 250/458.1
5,305,759 A * 4/1994 Kaneko et al. ............. 600/476
6,697,196 B2 * 2/2004 Suzuki ....................... 359/385

FOREIGN PATENT DOCUMENTS

| JP | 2-298909 A | 12/1990 |
|---|---|---|
| JP | 7-248450 A | 9/1995 |
| JP | 8-71085 A | 3/1996 |
| JP | 9-68742 A | 3/1997 |
| JP | 2000-137167 A | 5/2000 |
| WO | WO 01/21771 A2 | 3/2001 |

* cited by examiner

Primary Examiner—Mark A. Robinson
(74) Attorney, Agent, or Firm—Frishauf, Holtz, Goodman & Chick, P.C.

(57) ABSTRACT

According to the present invention, there is provided a microscope system comprising an illuminating portion which illuminates a subject, an image forming lens which projects the subject illuminated by the illuminating portion onto an image pickup element, a light adjustment portion which adjusts a light amount of the illuminating portion, a zoom mechanism which changes a magnification of a subject image projected onto the image pickup element by the image forming lens, and a control portion which changes an excitement pulse width into the illuminating portion in synchronization with a driving pulse of the image pickup element in response to adjustment by the light adjustment portion to control the light amount of illumination light and which varies the excitement pulse width in accordance with the change of the magnification by the zoom mechanism.

15 Claims, 29 Drawing Sheets

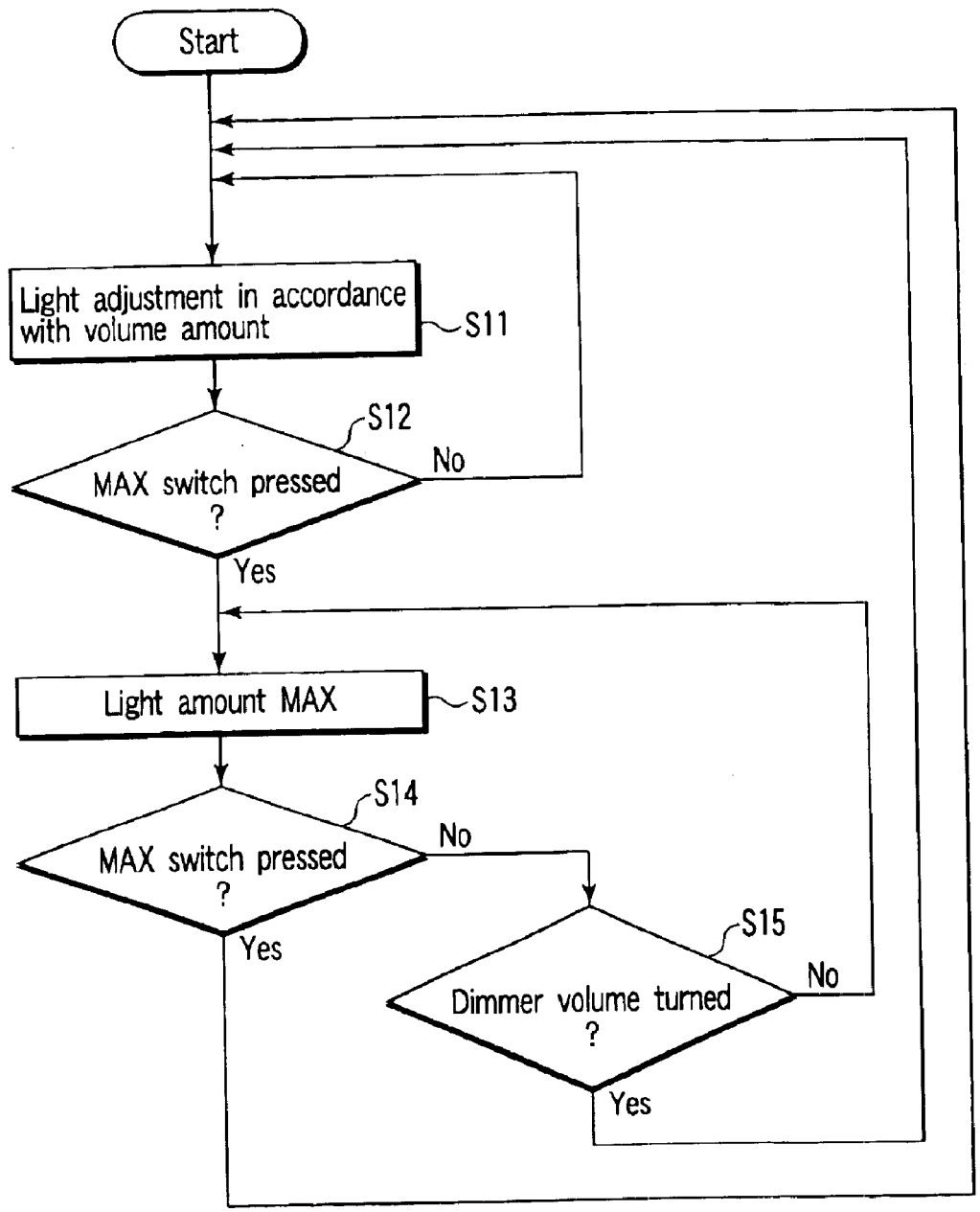
F I G. 27

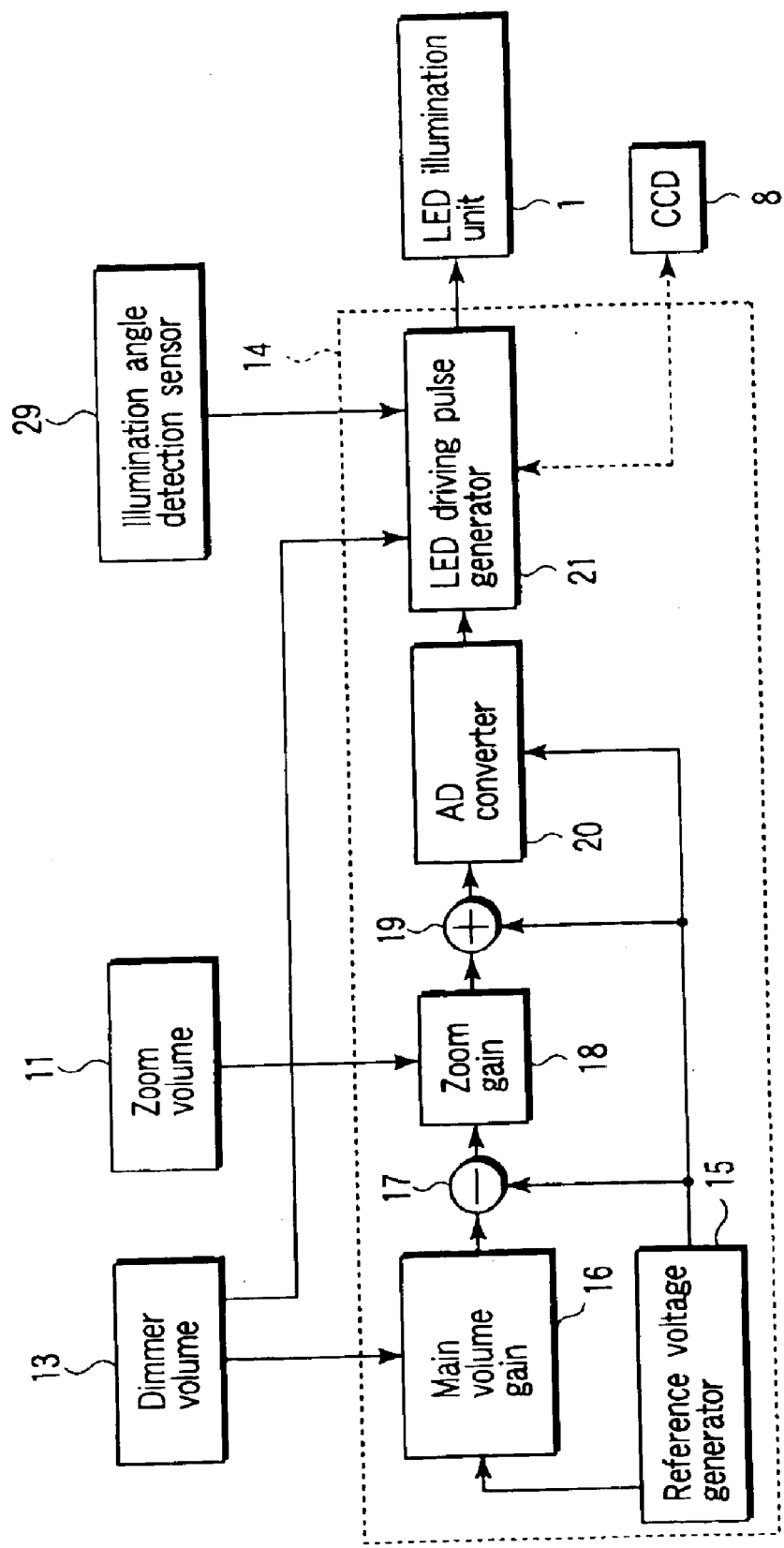
F I G. 29

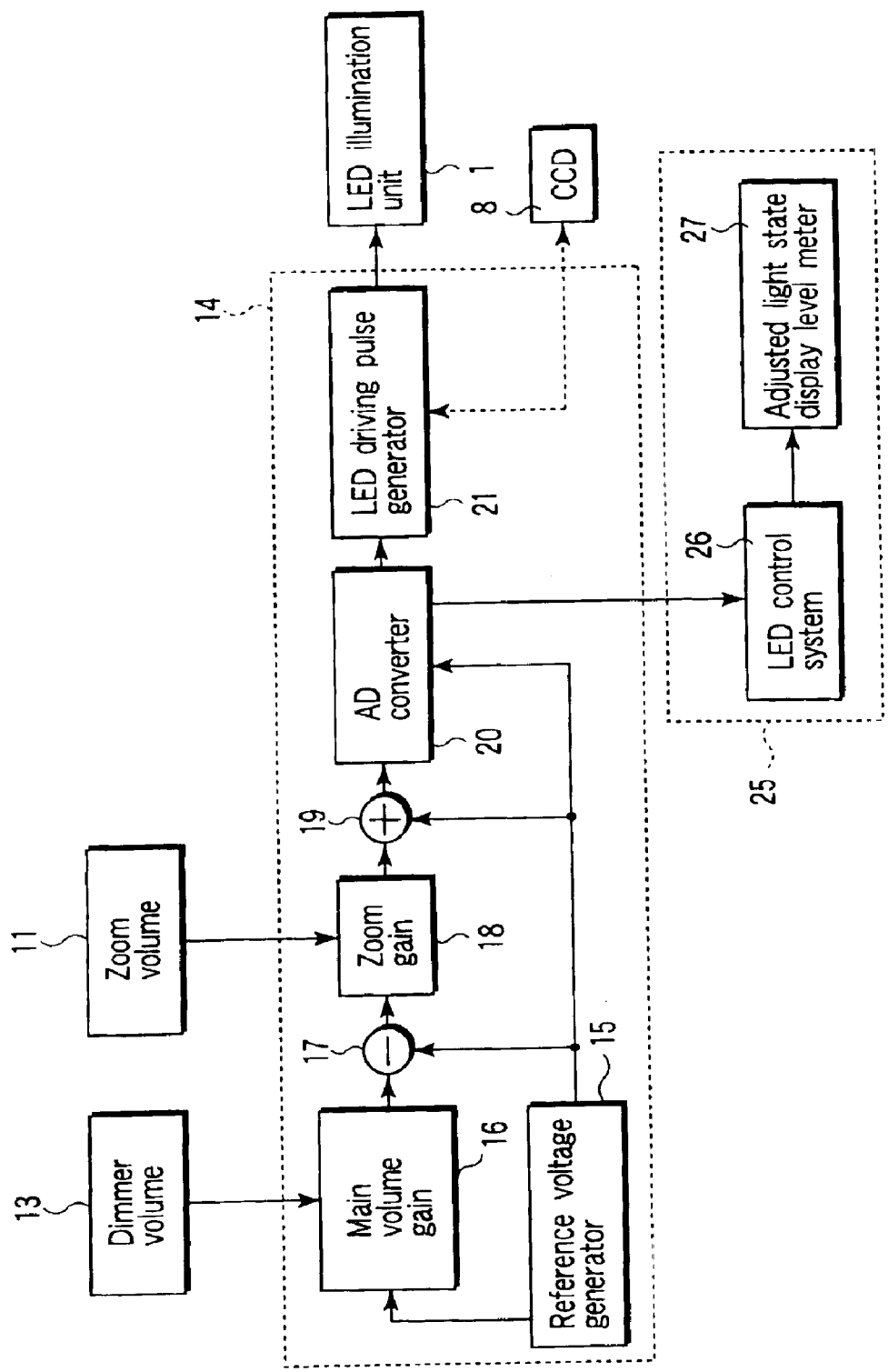
F I G. 33

Min light amount time

1/2 light amount time

Max light amount time

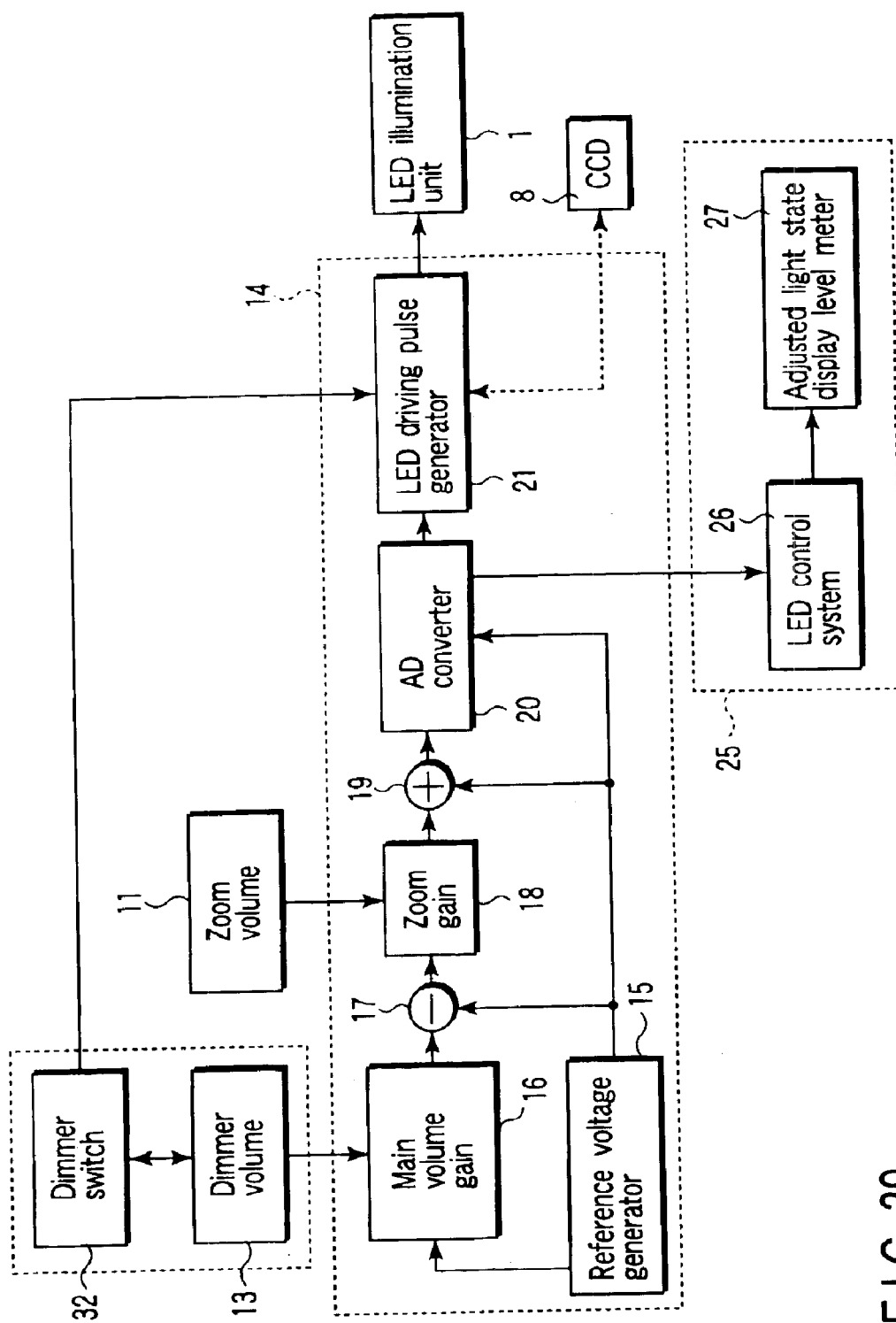
F I G. 39

Min Light amount time

1/2 Light amount time

Max Light amount time

MICROSCOPE SYSTEM

CROSS-REFERENCE TO RELATED APPLICATIONS

This is a Continuation Application of PCT Application No. PCT/JP02/13189, filed Dec. 17, 2002, which was not published under PCT Article 21(2) in English.

This application is based upon and claims the benefit of priority from prior Japanese Patent Applications No. 2001-383559, filed Dec. 17, 2001, No. 2002-003825, filed Jan. 10, 2002; and No. 2002-065791, filed Mar. 11, 2002, the entire contents of all of which are incorporated herein by reference.

BACKGROUND OF THE INVENTION

1. Field of the Invention

The present invention relates to a microscope system.

2. Description of the Related Art

In illumination operation control of a microscope, a technique of associating intensity of illumination light with change of an observation optical system is known. For example, when a zoom lens is changed to high magnification from low magnification, in general, the subject image darkens. In Jpn. Pat. Appln. KOKAI Publication No. 7-248450, a method is disclosed comprising: selecting a combination of optimum dimmer filters from a parameter table of a zoom magnification and light amount ratio; and switching IN/OUT the dimmer filter in an optical path to perform an automatic light adjustment control.

Moreover, in Jpn. Pat. Appln. KOKAI Publication No. 2000-137167, a method is disclosed comprising: picking up an image of a subject by an image pickup element; and controlling a power voltage supplied to a light source based on luminance information to perform light adjustment. Furthermore, in Jpn. Pat. Appln. KOKAI Publication No. 9-68742, a method is disclosed comprising: synchronizing an open/close period of a shutter of a camera with the illumination period of an LED for power saving.

Additionally, in the Jpn. Pat. Appln. KOKAI Publication No. 7-248450, a microscope system is disclosed including an objective lens and zoom mechanism. In this microscope system, the zoom mechanism includes means for storing a parameter of observation light amount, this parameter is referred to, and a dimmer member (ND filter) is controlled (combined insertion/detachment) so that the observation light amount before/after magnification change is kept constant.

However, in the Jpn. Pat. Appln. KOKAI Publication No. 7-248450, in order to switch IN/OUT the filter, the filter itself, a mechanism for driving the filter, and an electric control mechanism are required, and there are disadvantages that the apparatus is enlarged and the cost is raised.

Moreover, in the light adjustment control performed with the power voltage of the light source as in the Jpn. Pat. Appln. KOKAI Publication No. 2000-137167, an apparatus for calculating image data is required, the apparatus is similarly enlarged, and the cost is raised. Furthermore, since the dimmer control is a control to change the magnitude of the supply voltage, the color temperature of the light source changes with luminance. Even when the same subject is observed, but when the light adjustment is performed, the subject disadvantageously changes in color. Therefore, in microscope observation in which the state of a cell as the subject is judged from the color or shape of the cell, it is very difficult to perform the light adjustment in a method of adjusting the power voltage of the light source.

Furthermore, a product has heretofore been published in which an LED having low power consumption capability and high reliability is used as illumination. In general, the light adjustment control of the LED illumination include a supply voltage/current control, and a pulse control for changing conduction time of the supply current. However, for the supply voltage/current control, since the color temperature changes even in the LED, the control cannot be used in microscope observation.

Therefore, the light adjustment of the LED is performed by the pulse control, but a lighted period and extinguished period of the LED exist, and disadvantages are accordingly generated that a striped pattern is made in a screen in TV observation. To solve the problem, in Jpn. Pat. Appln. KOKAI Publication No. 9-68742, a method of synchronizing the shutter open/close period of the camera with the illumination period of the LED is disclosed.

However, in any of the above-described related arts, when natural energies such as sunlight are used as the light source for the subject to save electric power without using the light source of the microscope, relevance between image information and light source is eliminated, and therefore there is possibility that the disadvantage of the system by the light adjustment control is generated.

Moreover, in the Jpn. Pat. Appln. KOKAI Publication No. 7-248450, the light amount parameter needs to be stored in a PC memory or the like in order to maintain the observation light amount before/after the magnification change to be constant, and the image pickup element for detecting the light amount and electronic devices such as a storage memory are required. Furthermore, a housing, wiring, power supply, assembly adjustment, and the like are required for configuring a network of the electronic devices, and there is a problem that a very high cost is required.

On the other hand, for the method of controlling the power voltage to be supplied to the light source and performing the light adjustment as in the Jpn. Pat. Appln. KOKAI Publication No. 2000-137167, when the power voltage obtainable for the light adjustment reaches a maximum value, the light amount cannot be raised any more. However, this cannot be notified to an observer.

Moreover, in Jpn. Pat. Appln. KOKAI Publication No. 8-71085, a method is disclosed comprising: controlling an aperture area of an aperture diaphragm in accordance with the magnification of a zoom lens system to perform the light adjustment. Even in this case, at the maximum value of the aperture area of the aperture diaphragm, which can be obtained for the light adjustment, that is, in a state in which the light amount cannot be raised any more, this cannot be notified to the observer.

In this manner, the observer is not informed of anything even in the state in which the light amount is not adjusted. Therefore, when the light adjustment is impossible, there is a problem that the observer has an unnecessary feeling of insecurity.

BRIEF SUMMARY OF THE INVENTION

According to the present invention, there is provided a microscope system comprising: an illuminating portion which illuminates a subject; an image forming lens which projects the subject illuminated by the illuminating portion onto an image pickup element; a light adjustment portion which adjusts a light amount of the illuminating portion; a zoom mechanism which changes a magnification of a subject image projected onto the image pickup element by the image forming lens; and a control portion which changes an excitement pulse width into the illuminating portion in synchronization with a driving pulse of the image pickup element in response to adjustment by the light adjustment portion to control the light amount of illumination light and which varies the excitement pulse width in accordance with the change of the magnification by the zoom mechanism.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 27 is a flowchart showing the operation procedure of the microscope system according to the seventh embodiment of the present invention;

FIG. 29 is a block diagram concerning the light adjustment function of the microscope system according to the eighth embodiment of the present invention;

FIG. 33 is a block diagram concerning the light adjustment function of the microscope system according to the tenth embodiment of the present invention;

FIG. 39 is a block diagram showing the modification example of the light adjustment function of the microscope system according to the tenth embodiment of the present invention;

DETAILED DESCRIPTION OF THE INVENTION

Embodiments of the present invention will be described hereinafter with reference to the drawings.

Figure 1:
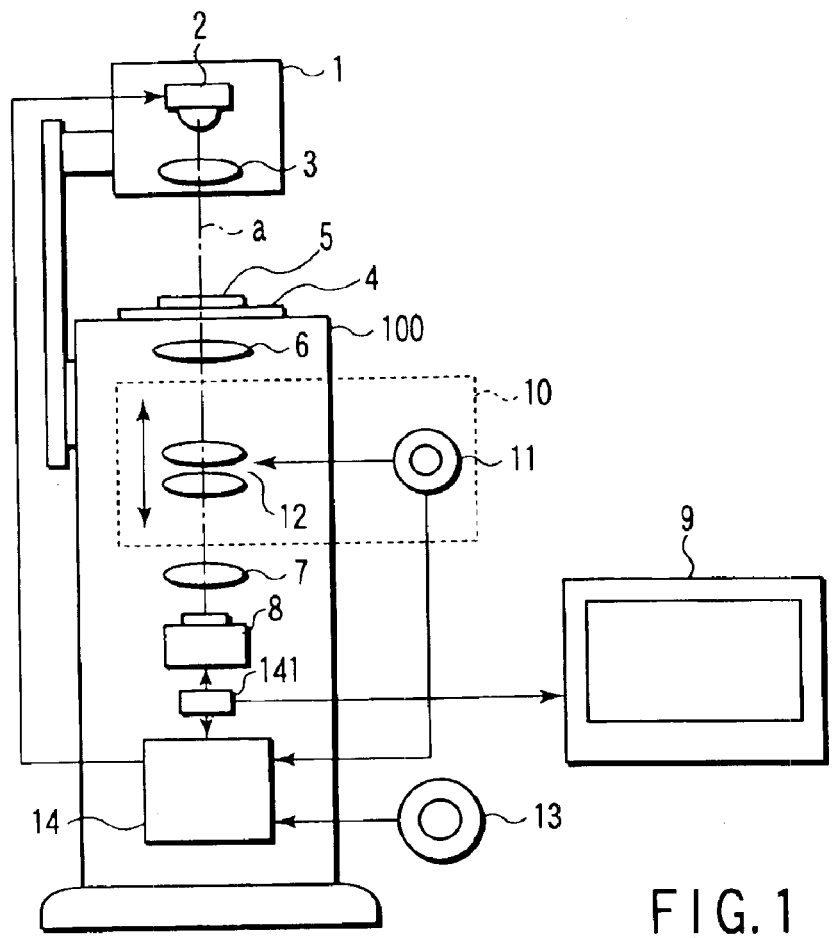
FIG. 1 is a diagram showing a whole configuration of a microscope system according to a first embodiment of the present invention.

FIG. 1 is a diagram showing a whole configuration of a microscope system according to a first embodiment of the present invention. As shown in FIG. 1, an LED illumination unit 1 includes an LED 2 and collector lens 3. A stage 4 is disposed on the top of the microscope main body 100, and a subject 5 is laid on the stage 4. Furthermore, the microscope main body 100 includes a subject-side lens 6, an image forming lens 7, a CCD 8 which is an image pickup element, a zoom mechanism 10, a light adjustment control portion 14, and a CCD signal processing portion 141. On an optical axis a of the LED 2, the collector lens 3, stage 4, the subject-side lens 6, a zoom lens group 12, the image forming lens 7, and the CCD 8 are disposed.

The light adjustment control portion 14 performs a light adjustment control of the LED illumination unit 1 based on a resistance value of a zoom volume 11 and dimmer volume 13. The CCD signal processing portion 141 is connected to the CCD 8 and light adjustment control-portion 14, and is further connected to a monitor 9 which is a unit separate from the microscope main body 100. The CCD signal processing portion 141 processes an image pickup signal from the CCD 8 to generate a video signal. The monitor 9 receives the video signal from the CCD signal processing portion 141 to display an observation image of the subject 5.

In the LED illumination unit 1, lights emitted downwards from the LED 2 are collected by the collector lens 3 to illuminate the subject 5 fixed on the stage 4. The image of the subject 5 illuminated by illumination light from the LED 2 is formed onto the CCD 8 by the subject-side lens 6, zoom lens group 12, and image forming lens 7, and observed in the monitor 9 via the CCD signal processing portion 141. It is to be noted that for the formed subject image, a projection magnification (hereinafter referred to as the zoom magnification) can be changed by the zoom mechanism 10.

The operation of the zoom mechanism 10, that is, the changing of the zoom magnification is performed by a rotary ring (not shown in FIG. 1. This corresponds to a rotary ring 603 of FIG. 19 described later). The zoom volume 11 comprises a variable resistor which performs light adjustment to cancel a brightness change of the observation image generated by fluctuation of the zoom magnification. The zoom volume 11 operates with a rotation operation of the rotary ring by a link mechanism (not shown). The dimmer volume 13 comprises the variable resistor for performing the light adjustment independently of the zoom mechanism 10. The light adjustment control portion 14 receives outputs from the zoom volume 11 and dimmer volume 13 to perform the light adjustment control of the LED illumination unit 1.

According to this configuration, (1) the brightness change of the observation image accordingly generated is automatically corrected, when the zoom magnification is changed by the operation of the rotary ring by an observer, and (2) the observer can operate the dimmer volume 13 to adjust illumination light amount independently of the zoom magnification, when the observer wants to change the brightness of the observation image.

Figure 2A:
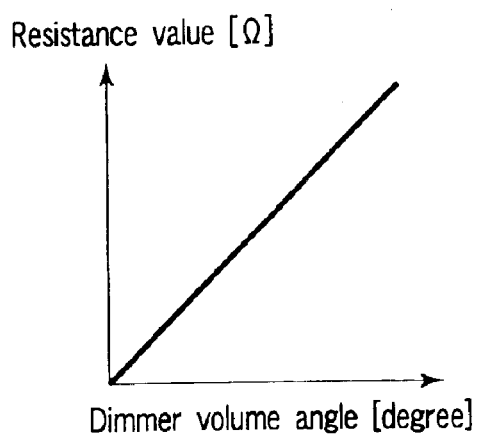
FIG. 2A is a diagram showing an example of a change of a resistance value with respect to a rotation angle of a dimmer volume according to the first embodiment of the present invention.
Figure 2B:
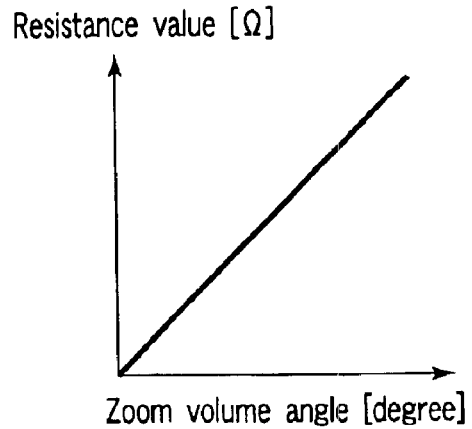
FIG. 2B is a diagram showing the example of the change of the resistance value with respect to the rotation angle of a zoom volume according to the first embodiment of the present invention.

FIG. 2A is a diagram showing an example of a change of a resistance value with respect to a rotation angle of the dimmer volume 13, and FIG. 2B is a diagram showing the example of the change of the resistance value with respect to the rotation angle of the zoom volume 11. In the zoom mechanism 10, when the zoom lens group 12 moves in an optical axis a direction, a projection magnification is set to be variable. That is, in the zoom mechanism 10, the zoom lens group 12 is linked to the zoom volume 11 comprising the variable resistor whose resistance value changes in accordance with the rotation angle corresponding to the magnification shown in FIG. 2B, and the resistance value changes in response to the rotation of the rotary ring. The dimmer volume 13 is a main volume switch for the observer to perform the light adjustment, and is constituted of the variable resistor whose resistance value changes in response to the rotation angle of the dimmer volume 13 as shown in FIG. 2A in the same manner as the zoom volume 11.

The light adjustment control portion 14 receives the outputs of the zoom volume 11 and dimmer volume 13 to perform the light adjustment control of the LED illumination unit 1.

Figure 3:
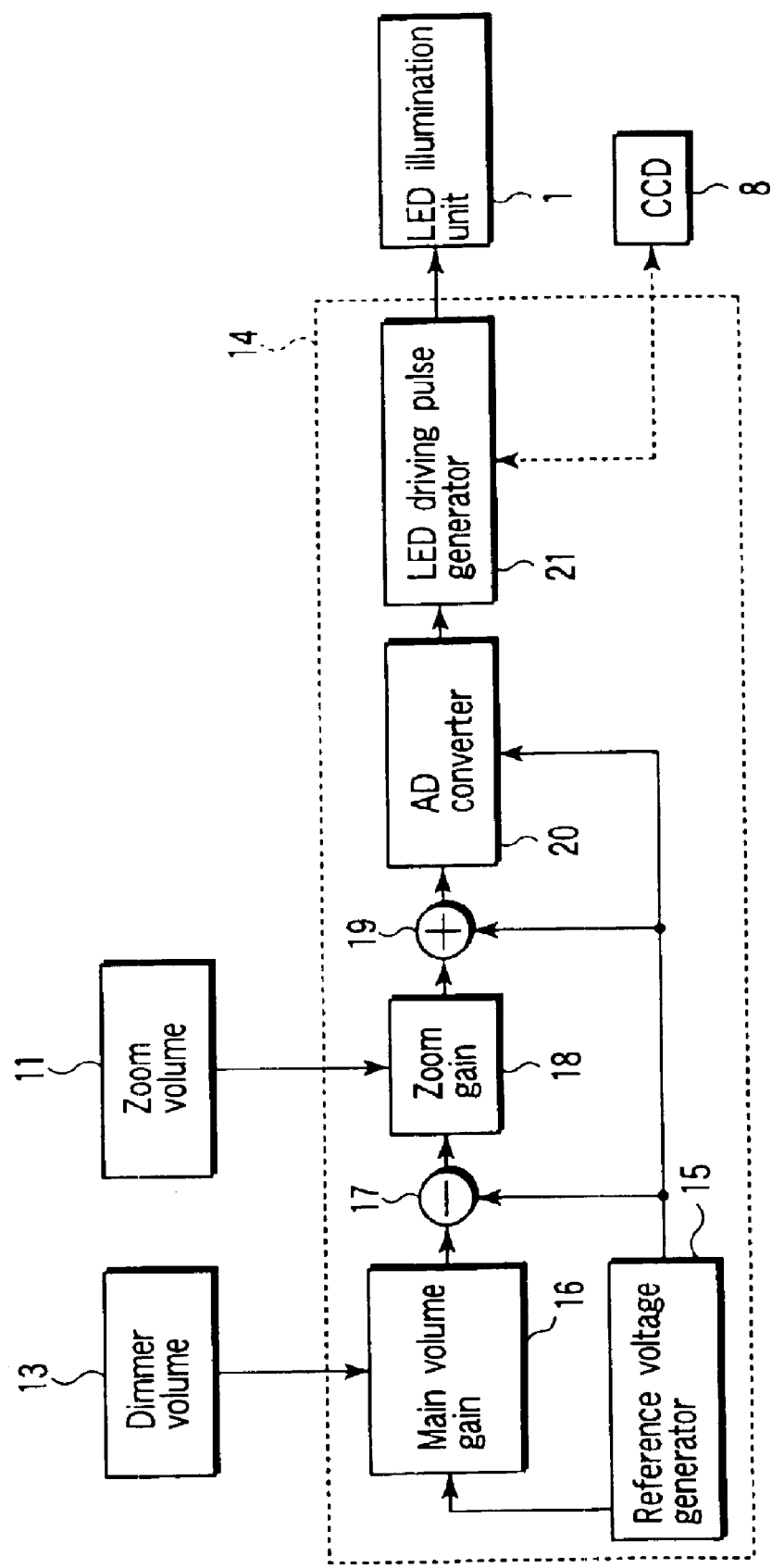
FIG. 3 is a block diagram concerning a light adjustment function of the microscope system according to the first embodiment of the present invention.

FIG. 3 is a block diagram concerning the light adjustment function of the microscope system. As shown in FIG. 3, in the light adjustment control portion 14, a reference voltage generator 15 is connected to a main volume gain 16, subtracter 17, adder 19, and A/D converter 20. The main volume gain 16 is connected to the A/D converter 20 via the subtracter 17, a zoom gain 18, and the adder 19, and the A/D converter 20 is connected to an LED driving pulse generator 21. Furthermore, the main volume gain 16 is connected to the dimmer volume 13, and the zoom gain 18 is connected to the zoom volume 11. The LED driving pulse generator 21 is connected to the LED illumination unit 1 and CCD 8.

The reference voltage generator 15 generates a reference voltage ref to be outputted to the main volume gain 16, and reference voltages VRB, VRT to be outputted to the A/D converter 20. In the first embodiment, the reference voltage generator 15 generates the reference voltage ref of 1V, and the reference voltages VRB, VRT of 1V, 3V, respectively.

The main volume gain 16 amplifies the reference voltage ref inputted from the reference voltage generator 15 in accordance with the resistance value of the dimmer volume 13, and performs amplification of one to three times here. The zoom gain 18 amplifies a voltage obtained by subtracting the reference voltage ref from the reference voltage amplified by the main volume gain 16 by the subtracter 17 in accordance with the resistance value of the zoom volume 11, and performs the amplification of one to ten times here.

The A/D converter 20 A/D-converts a voltage which is obtained by adding the reference voltage ref to the voltage amplified by the zoom gain 18 by the adder 19 again. Here, the A/D converter 20 A/D-converts a voltage range of 1V to 3V into values of 0 to 255.

Figure 4:
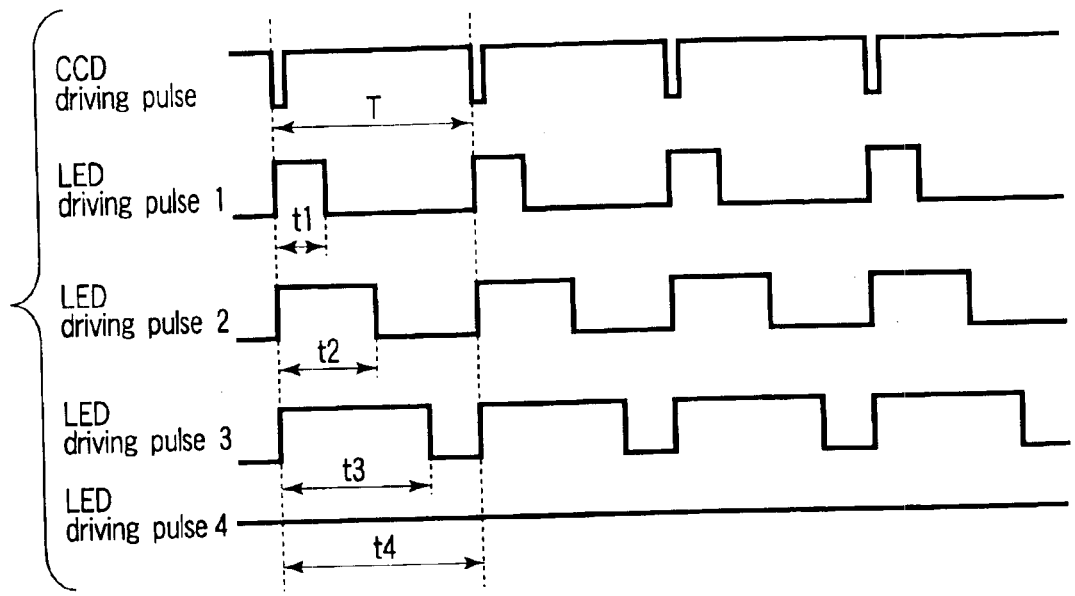
FIG. 4 is a diagram showing a relation between a CCD driving pulse and LED driving pulse according to the first embodiment of the present invention.
Figure 5:
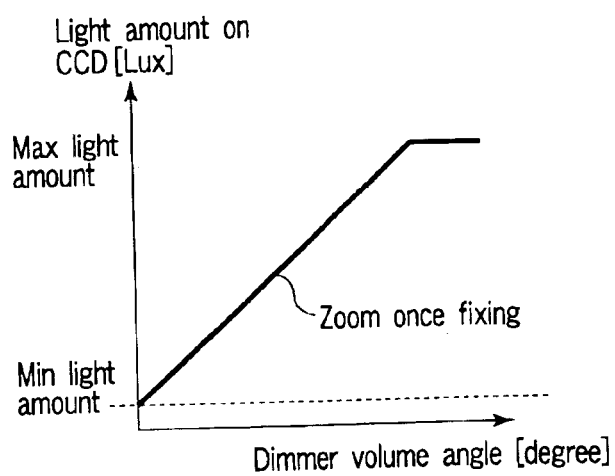
FIG. 5 is a diagram showing a relation between the rotation angle of the dimmer volume and a light amount of LED (light amount on CCD) according to the first embodiment of the present invention.
Figure 6:
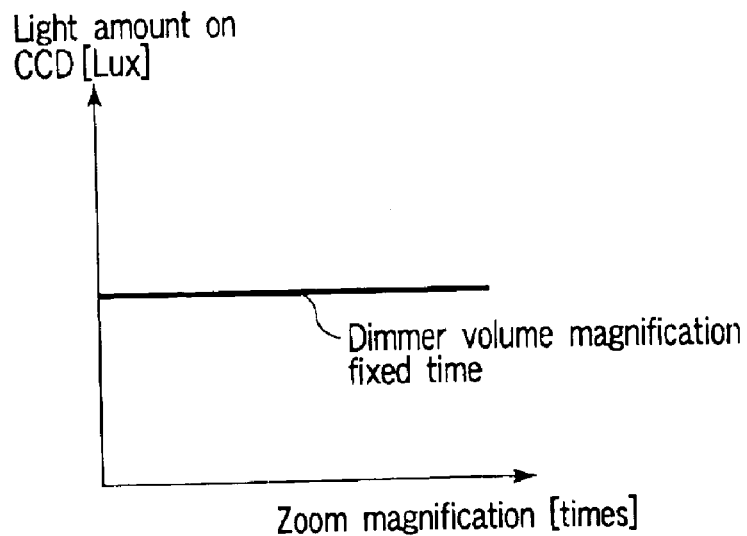
FIG. 6 is a diagram showing a relation between a zoom magnification and the light amount on the CCD according to the first embodiment of the present invention.

FIG. 4 is a diagram showing a relation between a CCD driving pulse and LED driving pulses. FIG. 5 is a diagram showing a relation between the rotation angle of the dimmer volume 13 and a light amount of the LED 2 (light amount on the CCD 8). FIG. 6 is a diagram showing a relation between a zoom magnification and the light amount on the CCD 8.

As shown in FIG. 4, the LED driving pulse generator 21 generates a CCD driving pulse for performing a driving control of the CCD 8, and generates the LED driving pulse for performing the light amount control of the LED. That is, the LED driving pulse generator 21 supplies the voltage to the LED 2 of the LED illumination unit 1 in synchronization with a period T of the CCD driving pulse as varying an excitement pulse width t.

The LED driving pulse generator 21 generates LED driving pulses which have different excitement pulse widths t1, t2, t3, t4 in synchronization with the period T of the CCD driving pulse as shown in FIG. 4. The excitement pulse width t is variable to a maximum pulse width from a minimum pulse width in response to digital values to 255 from 0 outputted from the A/D converter 20. With the maximum pulse width, continuous lighting is performed. Here, the minimum pulse width is represented as tmin.

Moreover, the LED driving pulse from the LED driving pulse generator 21 is supplied to the LED illumination unit 1, and the light amount of the LED 2 is controlled by the excitement pulse width t at this time.

Next, an operation in the microscope system of the first embodiment configured as described above will be described.

First, the operation will be described in observation assuming that the light amount from the LED 2 is ½ of a maximum value and the zoom magnification is once. When the observer rotates the dimmer volume 13 for light amount adjustment, the resistance value of the dimmer volume 13 changes in accordance with the rotation angle. In the light adjustment control portion 14, the reference voltage ref of 1V generated by the reference voltage generator 15 is amplified in accordance with the resistance value of the dimmer volume 13 by the main volume gain 16. For example, it is assumed that the observer sets the rotation angle of the dimmer volume 13 to an angle which is ½ of the maximum value. The main volume gain 16 performs the amplification to three times from once in accordance with the resistance value of the dimmer volume 13, and amplifies the voltage to about 2V here.

Subsequently, for the voltage amplified by the main volume gain 16, the subtracter 17 subtracts the reference voltage of 1V from 2V to obtain 1V, and further the zoom gain 18 amplifies the voltage in accordance with the resistance value of the zoom volume 11. The zoom gain 18 performs amplification to ten times from once in accordance with the resistance value of the zoom volume 11, here an amplification ratio is once because the zoom magnification is once, and the voltage remains at 1V.

For the voltage amplified by the zoom gain 18, the adder 19 adds the reference voltage of 1V to 1V to obtain 2V, and outputs the voltage to the A/D converter 20. The A/D converter 20 A/D converts the voltage range of 1V to 3V to the values of 0 to 255, and therefore the inputted voltage of 2V is outputted as 128 to the LED driving pulse generator 21.

The LED driving pulse generator 21 generates the LED driving pulses having the excitement pulse widths t1, t2, t3, t4 synchronized with the period T of the CCD driving pulse in accordance with the digital values of 0 to 255 inputted from the A/D converter 20. Here, since the digital value outputted from the A/D converter 20 is 128, the LED driving pulse having the excitement pulse width t2 being about ½ of the period T is generated, and this LED driving pulse is supplied to the LED illumination unit 3. Accordingly, with respect to the LED 2, the light adjustment of the light amount which is about ½ of the Max light amount in a continuous excited state is performed.

Next, it is assumed that the observer sets the rotation angle of the dimmer volume 13 to an angle of 0 which is the minimum value. In this case, in the main volume gain 16, the reference voltage ref (1V) inputted from the reference voltage generator 15 is amplified to once by the resistance value of the dimmer volume 13. The reference voltage ref (1V) is subtracted by the subtracter 17, and this voltage turns to 0V from 1V. Here, although the zoom magnification is once and the amplification ratio is once, the output voltage of the zoom gain 18 is 0V.

For the output voltage of the zoom gain 18, the adder 19 adds the reference voltage ref (1V), and the voltage rises to 1V from 0V, and is inputted into the A/D converter 20. The A/D converter 20 converts the voltage of 1V inputted from the adder 19 into a digital value of 0, and inputs the value into the LED driving pulse generator 21.

Since the digital value outputted from the A/D converter 20 is 0, the LED driving pulse generator 21 generates the LED driving pulse having the excitement pulse width t1 synchronized with the period T of the CCD driving pulse, that is, a minimum pulse width tmin, and this LED driving pulse is supplied to the LED illumination unit 3. Accordingly, with respect to the LED 2, the light adjustment of the Min light amount which is a minimum light amount is performed.

Next, it is assumed that the observer sets the rotation angle of the dimmer volume 13 to an angle having a maximum value. In this case, in the main volume gain 16, the reference voltage ref (1V) inputted from the reference voltage generator 15 is amplified three times by the resistance value of the dimmer volume 13 to obtain a voltage of 3V. The reference voltage ref (1V) is subtracted from this voltage by the subtracter 17, and this voltage of 3V turns to 2V. Moreover, the output voltage of the zoom gain 18 remains 2V, because the zoom magnification is once and the amplification factor is once here.

The reference voltage ref (1V) is added to the voltage amplified by the zoom gain 18 by the adder 19, 2V rises to 3V, and this is inputted into the A/D converter 20. The A/D converter 20 converts the voltage of 3V inputted from the adder 19 to a digital value of 255, and inputs the value into the LED driving pulse generator 21.

Since the digital value outputted from the A/D converter 20 is 255, the LED driving pulse generator 21 generates the LED driving pulse having the excitement pulse width t4 which is the same as the period T, and this LED driving pulse is supplied to the LED illumination unit 3. Accordingly, with respect to the LED 2, the light adjustment of the Max light amount in the continuous excited state is performed.

Therefore, as shown in FIG. 5, when the rotation angle of the dimmer volume 13 is allowed to be variable, continuous light adjustment of the illumination light is possible. Moreover, since the light adjustment is performed by the pulse control synchronized with the driving pulse of the CCD 8, the color temperature does not change, and the light adjustment observable with the monitor 9 can be performed.

Subsequently, a case will be described in which the zoom volume 11 is allowed to be variable. In the following, a case will be described in which the zoom magnification is allowed to be variable to 1.2 times from once described above. When the observer rotates the zoom volume 11 to vary the state of once described above to a state of 1.2 times, the zoom lens group 12 moves to a position corresponding to the zoom magnification, and the projection magnification to the CCD 8 is 1.2 times.

Moreover, the resistance value of the zoom volume 11 changes in accordance with the magnification. The zoom gain 18 performs the amplification corresponding to the zoom magnification in accordance with the resistance value of the zoom volume 11, and here the amplification ratio of the zoom gain 18 is 1.4 times which is equal to square of the zoom magnification. Since the excitement pulse width t is variable in response to the voltage from the zoom gain 18, the excitement pulse width is also 1.4 times. Therefore, the light amount from the LED illumination unit 1 is 1.4 times that at a time of the zoom magnification of once, but the light amount projected onto the CCD 8 is 1/1.4 because of the projection magnification.

Therefore, as shown in FIG. 6, the light amount on the CCD 8 is constant irrespective of the zoom magnification, and is equal to that at the time of the zoom magnification of once, even when the zoom magnification is 1.2 times. Accordingly, even when the zoom magnification is variable, the observation is possible in a constant bright state.

Moreover, the light adjustment control portion 14 is configured as described above. Therefore, when the angle of the dimmer volume 13 is minimized, an output of the A/D converter 20 turns to 0 irrespective of the magnification value of the zoom volume 11, the excitement pulse width t is therefore a minimum width tmin, and the light is adjusted to obtain Min light amount. When the angle of the dimmer volume 13 is maximized, the output of the A/D converter 20 is 255, the excitement pulse width t is therefore brought into a maximum width, that is, a state of continuous lighting, and the light is adjusted to obtain Max light amount. It is to be noted that even when the angle of the dimmer volume 13 is minimized, the driving pulse is outputted to the CCD 8. Therefore, when the light amount of the LED illumination unit 1 is minimized, the observation is possible using the natural energy of sunlight in illumination.

Figure 8:
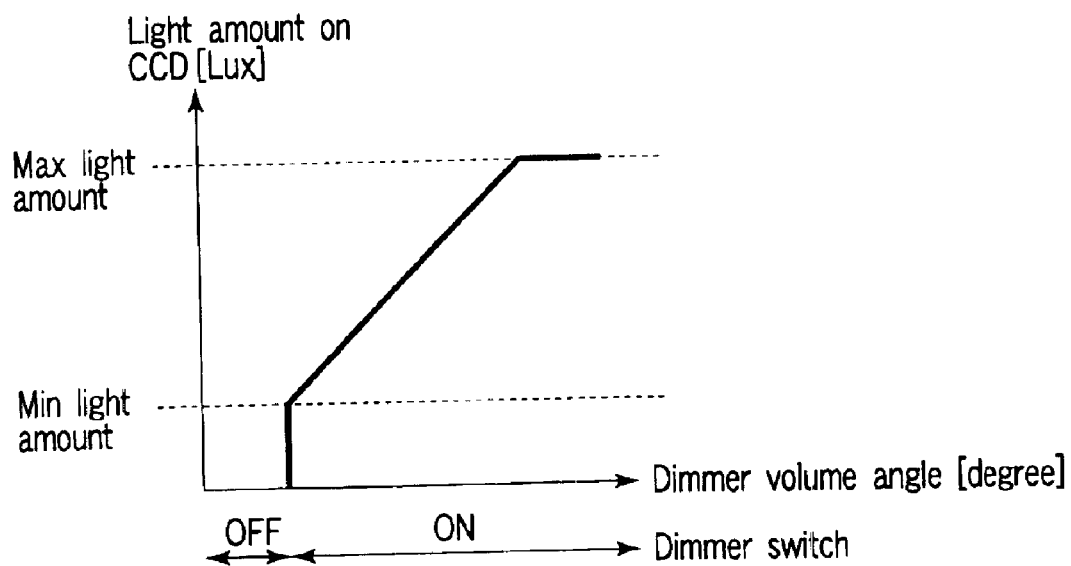
FIG. 8 is a diagram showing the relation between the rotation angle of the dimmer volume and the light amount of LED (light amount on CCD) according to the second embodiment of the present invention.
Figure 7:
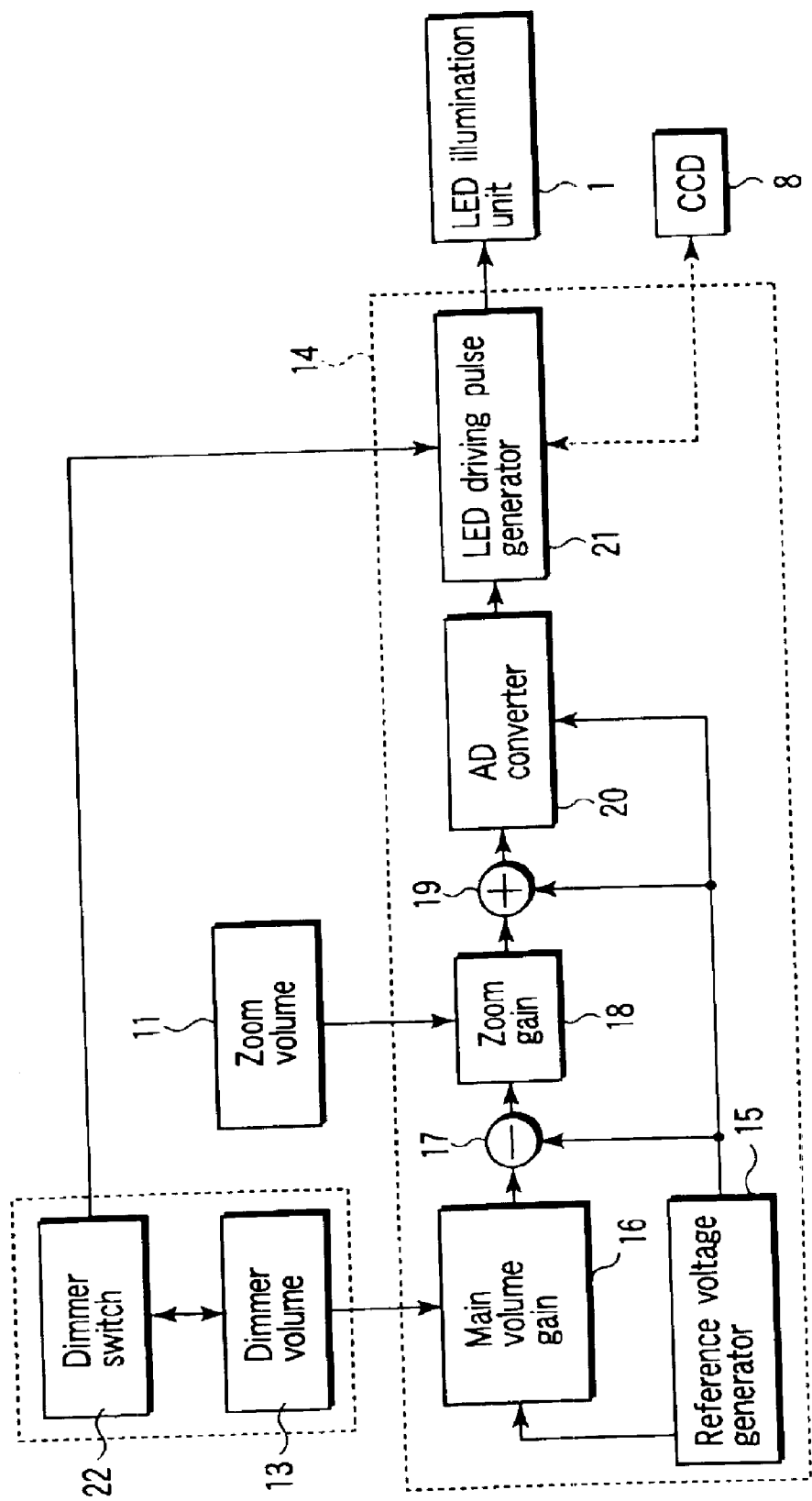
FIG. 7 is a block diagram concerning the light adjustment function of the microscope system according to a second embodiment of the present invention.

FIG. 7 is a block diagram concerning the light adjustment function of the microscope system according to a second embodiment of the present invention. In FIG. 7, the same components as those of FIG. 3 are denoted with the same reference numerals. FIG. 8 is a diagram showing the relation between the rotation angle of the dimmer volume 13 and the light amount of LED 2 (light amount on CCD 8).

As shown in FIG. 7, the dimmer volume 13 and LED driving pulse generator 21 are connected to a dimmer switch 22. The dimmer switch 22 is a switch integral with the dimmer volume 13. When the resistance value of the dimmer volume 13 turns to 0, and the dimmer volume 13 is further rotated in a direction to lower the resistance value, as shown in FIG. 8, the switch turns OFF, and otherwise the switch turns ON.

Next, the operation in the microscope system of the second embodiment configured as described above will be described.

The operation of the second embodiment is similar to that of the first embodiment until the dimmer volume 13 is used to perform the light adjustment of the LED illumination unit 1. When the dimmer volume 13 is allowed to be variable, the excitement pulse width t into the LED 2 can continuously be varied to the maximum pulse width for performing the continuous lighting from the minimum pulse width.

When the observer rotates the dimmer volume 13 in a further decreasing direction of the resistance value from the minimum angle, the dimmer switch 22 is brought into OFF state. When the dimmer switch 22 is OFF, the LED driving pulse generator 21 performs a control to stop excitation of the LED 2. Moreover, when the observer rotates the dimmer volume 13 in an increasing direction of the resistance value, and the dimmer switch 22 is brought into ON state, the LED driving pulse generator 21 performs a control to start the excitation of the LED 2 again.

Therefore, when the observer simply operates the dimmer volume 13, it is possible to vary the excitement pulse width t and to turn ON, OFF the excitation, and the lighting operation of the LED can securely be performed without performing any intricate operation.

Figure 9:
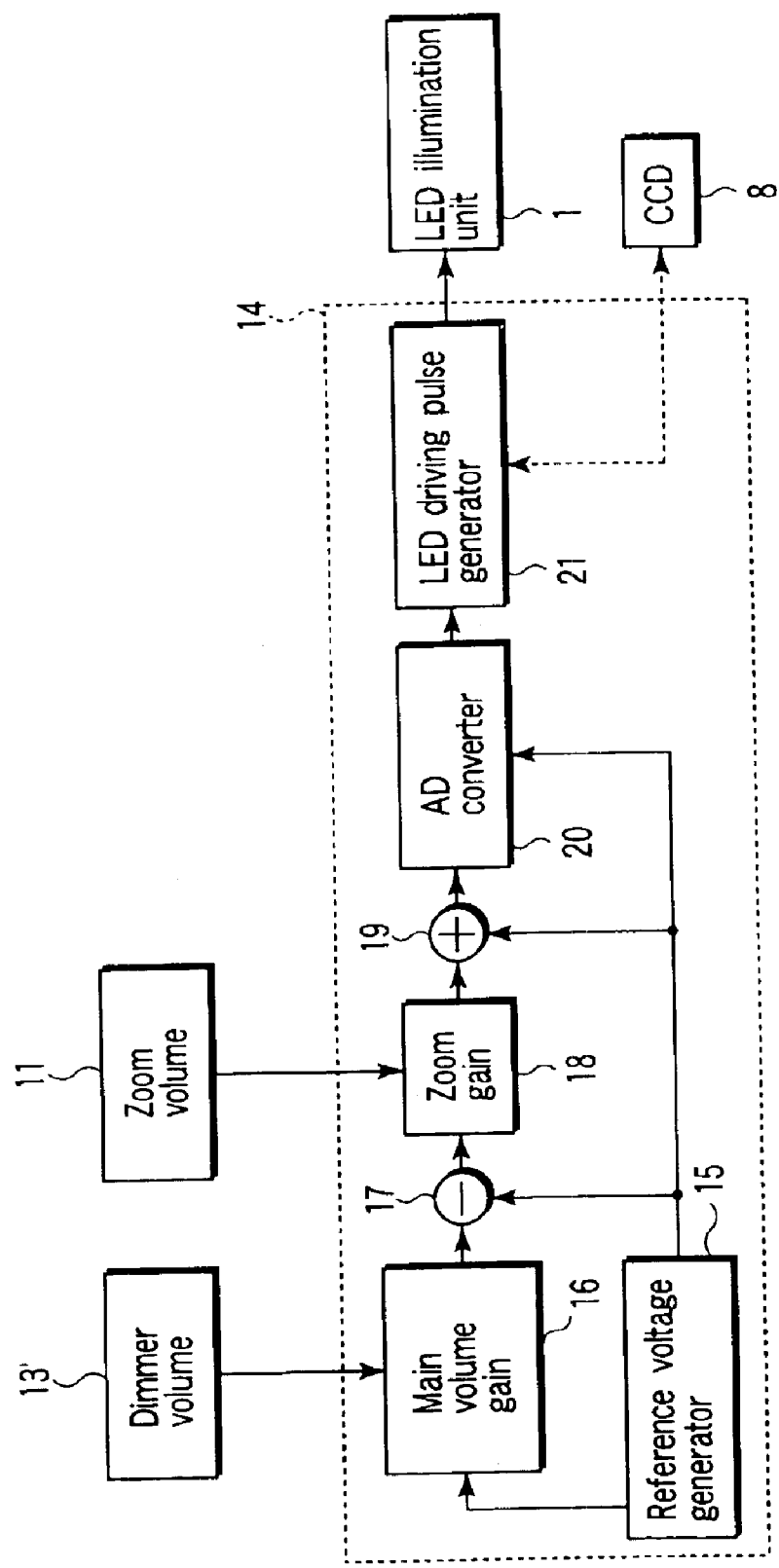
FIG. 9 is a block diagram concerning the light adjustment function of the microscope system according to a third embodiment of the present invention.
Figure 10:
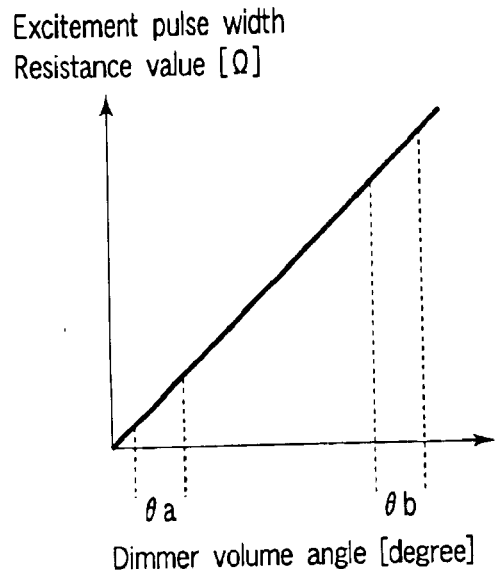
FIG. 10 is a diagram showing the change of the resistance value (excitement pulse width) with respect to the rotation angle of the dimmer volume in the first embodiment of the present invention.
Figure 11:
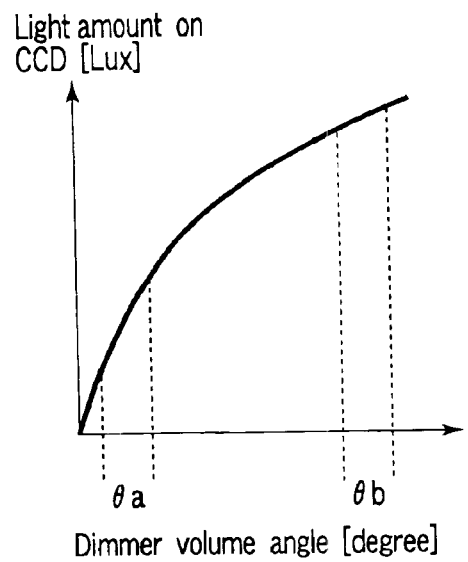
FIG. 11 is a diagram showing the change of the light amount on the CCD with respect to the rotation angle of the dimmer volume in the first embodiment of the present invention.
Figure 12:
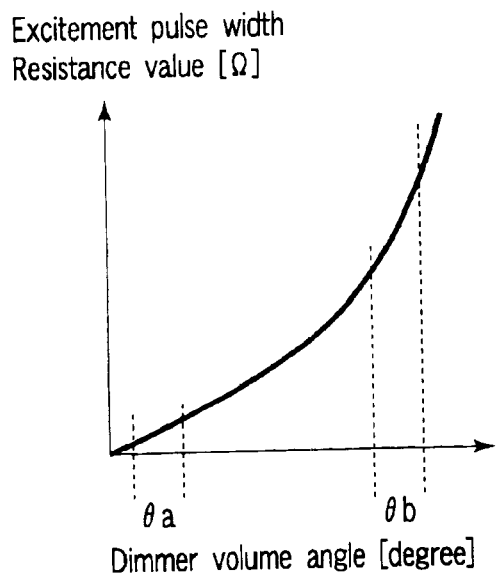
FIG. 12 is a diagram showing the change of the resistance value (excitement pulse width) with respect to the rotation angle of the dimmer volume in a third embodiment of the present invention.
Figure 13:
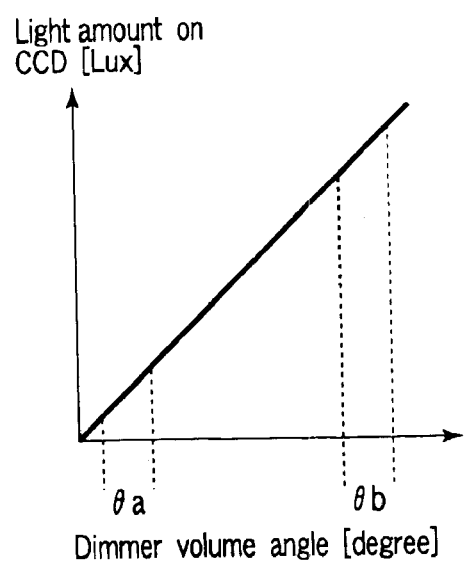
FIG. 13 is a diagram showing the change of the light amount on the CCD with respect to the rotation angle of the dimmer volume in the third embodiment of the present invention.

FIG. 9 is a block diagram concerning the light adjustment function of the microscope system according to a third embodiment of the present invention. In FIG. 9, the same components as those of FIGS. 3, 7 are denoted with the same reference numerals. FIG. 10 is a diagram showing the change of the resistance value (excitement pulse width) with respect to the rotation angle of the dimmer volume 13 in the first embodiment, and FIG. 11 is a diagram showing the change of the light amount on the CCD 8 with respect to the rotation angle of the dimmer volume 13. FIG. 12 is a diagram showing the change of the resistance value (excitement pulse width) with respect to the rotation angle of a dimmer volume 13' in the third embodiment, and FIG. 13 is a diagram showing the change of the light amount on the CCD 8 with respect to the rotation angle of the dimmer volume 13'.

As shown in FIG. 9, in the third embodiment, instead of the dimmer volume 13 shown in FIG. 3, the dimmer volume 13' is connected to the main volume gain 16.

When the main volume gain 16 is constituted of non-reverse amplification by a general operation amplifier, an amplification factor of the voltage is obtained by equation (1+R2/R1). Here, assuming that R1 is a fixed resistance of 4 kΩ and R2 is variable to 8 kΩ from 0Ω in the dimmer volume 13', the amplification factor of three times from once can be obtained from the above equation.

However, a change amount of the resistance value with respect to the change of the rotation angle of the dimmer volume is constant as shown in FIG. 10. In this case, for example, even when the volume is rotated by the same angle (about 36 degrees), a change ratio of the voltage is about 15% in the vicinity of θa (resistance value is in the vicinity of 800Ω) and 7% in the vicinity of θb (resistance value is in the vicinity of 8 kΩ), and differs with a rotated position of the dimmer volume.

Moreover, since the excitement pulse width t into the LED 2 is variable in accordance with the A/D converted voltage, as shown in FIG. 11, a ratio of the change of the rotation angle of the dimmer volume to that of the light amount differs. Therefore, by the rotation position of the dimmer volume, a degree of change of the illumination light differs even with the same rotated angle. Therefore, the observer has a sense of incongruity, and a light adjustment operation becomes intricate.

To solve the problem, the dimmer volume 13' of the third embodiment is assumed to have characteristics that with the rotation by the same angle, the change of the resistance value is little in the vicinity of θa having a small resistance value, and increases in the vicinity of θb having a large resistance value as shown in FIG. 12. Accordingly, as shown in FIG. 13, the ratio between the change of the rotation angle of the dimmer volume 13 and the change of the light amount can be set to be constant. Therefore, the observer can easily perform the light adjustment operation with respect to the subject without any sense of incongruity.

It is to be noted that in the third embodiment, the dimmer volume 13 having the characteristic of FIG. 10 is modified to the dimmer volume 13' having the characteristic of FIG. 12. However, assuming that the dimmer volume 13' has the characteristic of FIG. 10, the volume may also be disposed on a light adjustment volume axis (not shown). In this case, to link the dimmer volume 13' with the axis, the volume is rotated via a distorted cam. Accordingly, a characteristic curve is obtained in which the change amount is small in the vicinity of a small resistance value and large in the vicinity of a large resistance value as shown in FIG. 12. Moreover, even when the rotation angle of the dimmer volume shown in FIG. 10 is read, and a look-up table, and the like are used to perform the conversion so as to obtain the characteristic curve shown in FIG. 13, the volume can similarly be realized.

Figure 14:
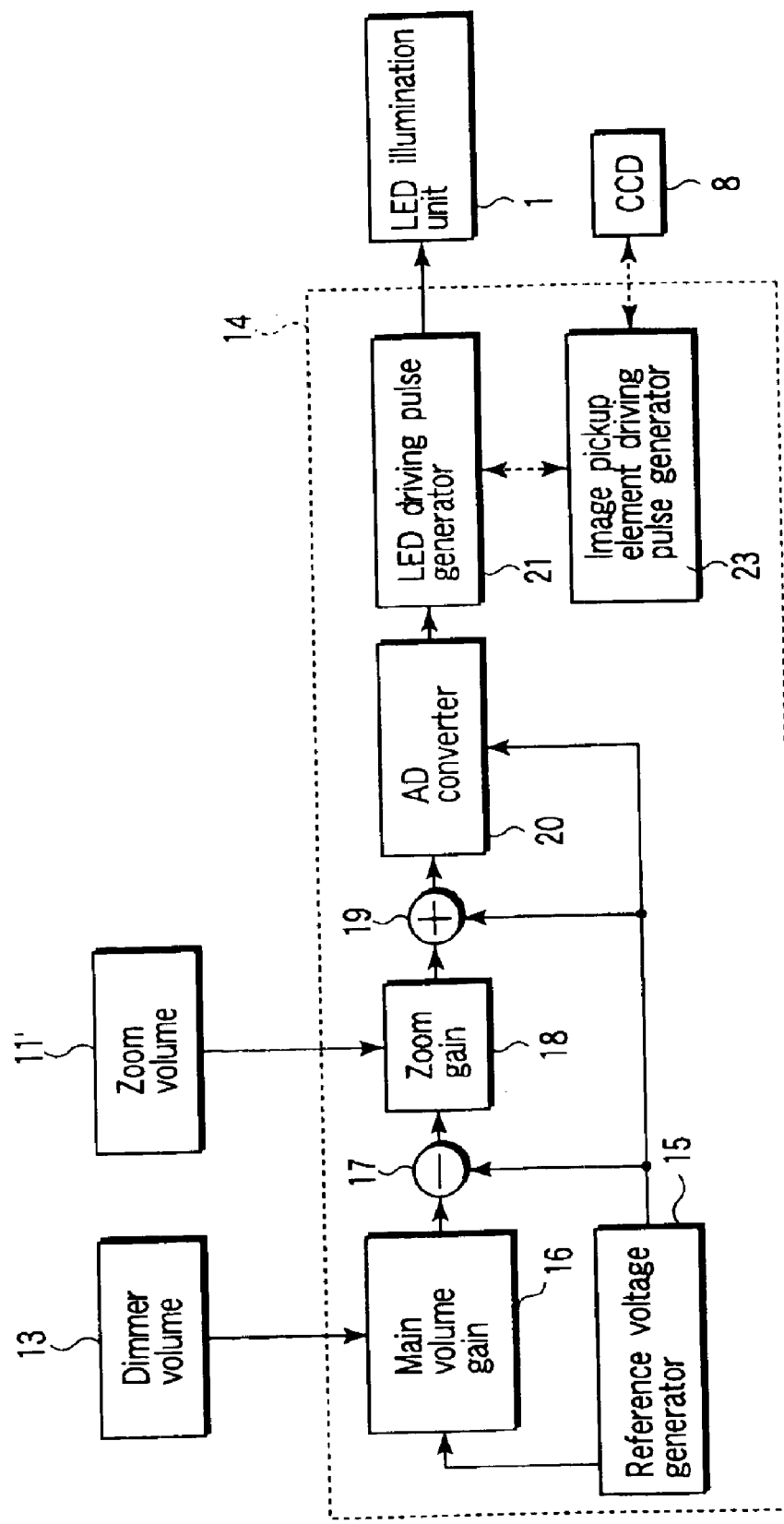
FIG. 14 is a block diagram concerning the light adjustment function of the microscope system according to a fourth embodiment of the present invention.
Figure 15:
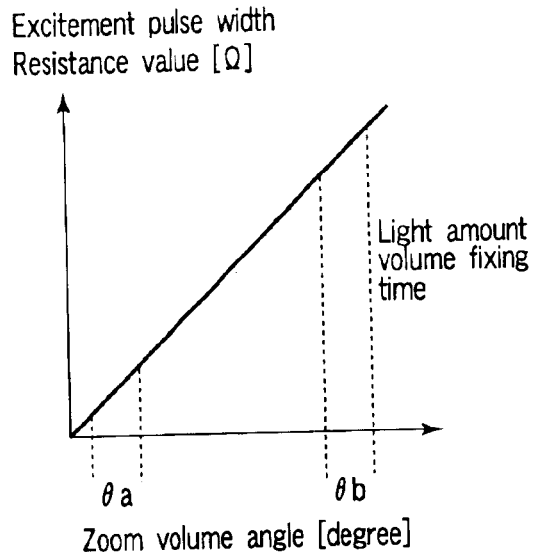
FIG. 15 is a diagram showing the change of the resistance value (excitement pulse width) with respect to the rotation angle of the zoom volume in the first embodiment of the present invention.
Figure 16:
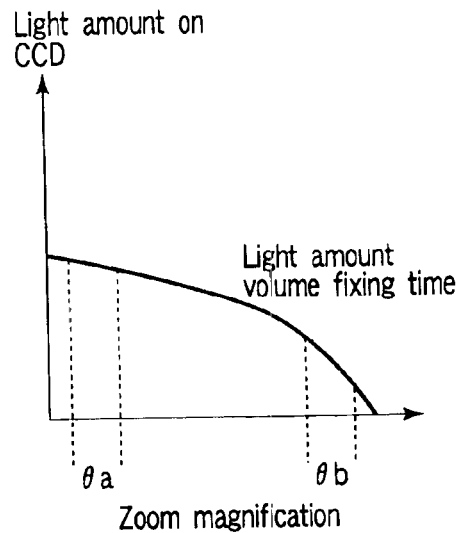
FIG. 16 is a diagram showing the change of the light amount on the CCD with respect to the rotation angle of the zoom volume in the first embodiment of the present invention.
Figure 17:
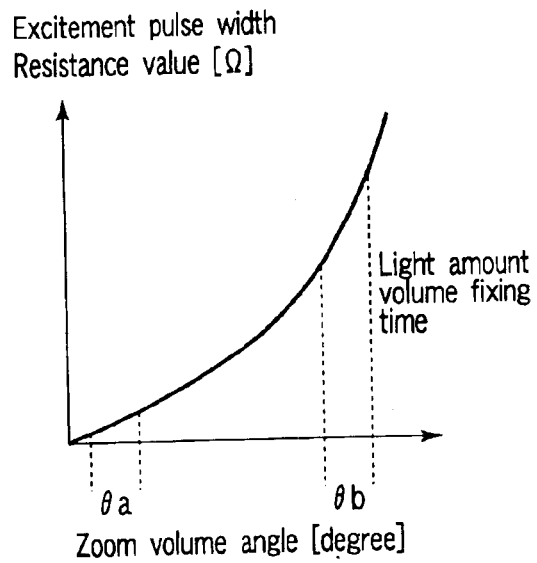
FIG. 17 is a diagram showing the change of the resistance value (excitement pulse width) with respect to the rotation angle of the zoom volume in a fourth embodiment of the present invention.
Figure 18:
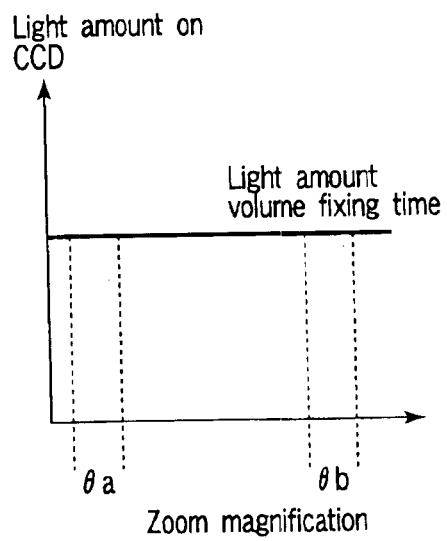
FIG. 18 is a diagram showing the change of the light amount on the CCD with respect to the rotation angle of the zoom volume in the fourth embodiment of the present invention.

FIG. 14 is a block diagram concerning the light adjustment function of the microscope system according to a fourth embodiment of the present invention. In FIG. 14, the same components as those of FIGS. 3, 7, 9 are denoted with the same reference numerals. FIG. 15 is a diagram showing the change of the resistance value (excitement pulse width) with respect to the rotation angle of the zoom volume 11 in the first embodiment, and FIG. 16 is a diagram showing the change of the light amount on the CCD 8 with respect to the rotation angle of the zoom volume 11. FIG. 17 is a diagram showing the change of the resistance value (excitement pulse width) with respect to the rotation angle of a zoom volume 11' in the fourth embodiment, and FIG. 18 is a diagram showing the change of the light amount on the CCD 8 with respect to the rotation angle of the zoom volume 11'.

As shown in FIG. 14, in the fourth embodiment, instead of the zoom volume 11 shown in FIG. 3, the zoom volume 11' is connected to the zoom gain 18.

When the zoom gain 18 is constituted of non-reverse amplification by the general operation amplifier, the amplification factor of the voltage is obtained by the equation (1+R2/R1). Here, assuming that R1 is the fixed resistance of 1 kΩ and R2 is variable to 10 kΩ from 0Ω in the zoom volume 11', the amplification factor of ten times from once can be obtained from the above equation.

However, the change amount of the resistance value with respect to the change of the rotation angle of the zoom volume is constant as shown in FIG. 15. In this case, for example, even when the volume is rotated by the same angle (about 36 degrees), the change ratio of the voltage is about 50% in the vicinity of θa (resistance value is in the vicinity of 1 kΩ) and 10% in the vicinity of θb (resistance value is in the vicinity of 10 kΩ), and differs with the rotated position of the zoom volume. Furthermore, a relation between a zoom magnification x and light amount y is $y=A/x^2$. Therefore, as shown in FIG. 16, the light amount on the CCD 8 differs by the rotated position of the zoom volume.

To solve the problem, the zoom volume 11' of the fourth embodiment is assumed to have the characteristics that with the rotation by the same angle, the change of the resistance value is little in the vicinity of θa having the small resistance value, and increases in the vicinity of θb having the large resistance value as shown in FIG. 17. Accordingly, as shown in FIG. 18, the light amount on the CCD 8 can be set to be constant irrespective of the rotation angle of the zoom volume 11'. Therefore, the observer can easily perform the light adjustment operation with respect to the subject without any sense of incongruity.

It is to be noted that in the fourth embodiment, the zoom volume 11 having the characteristic of FIG. 15 is modified to the zoom volume 11' having the characteristic of FIG. 17. However for example, assuming that the zoom volume 11' has the characteristic of FIG. 15, the volume may also be disposed on the zoom volume axis (not shown). In this case, to link the zoom volume 11' with the axis, the volume is rotated via the distorted cam. Accordingly, the characteristic curve is obtained in which the change amount is small in the vicinity of the small resistance value and large in the vicinity of the large resistance value as shown in FIG. 17. Moreover, even when the zoom volume rotation angle shown in FIG. 15 is read, and the look-up table, and the like are used to perform the conversion so as to obtain the characteristic curve shown in FIG. 18, the volume can similarly be realized.

Figure 19:
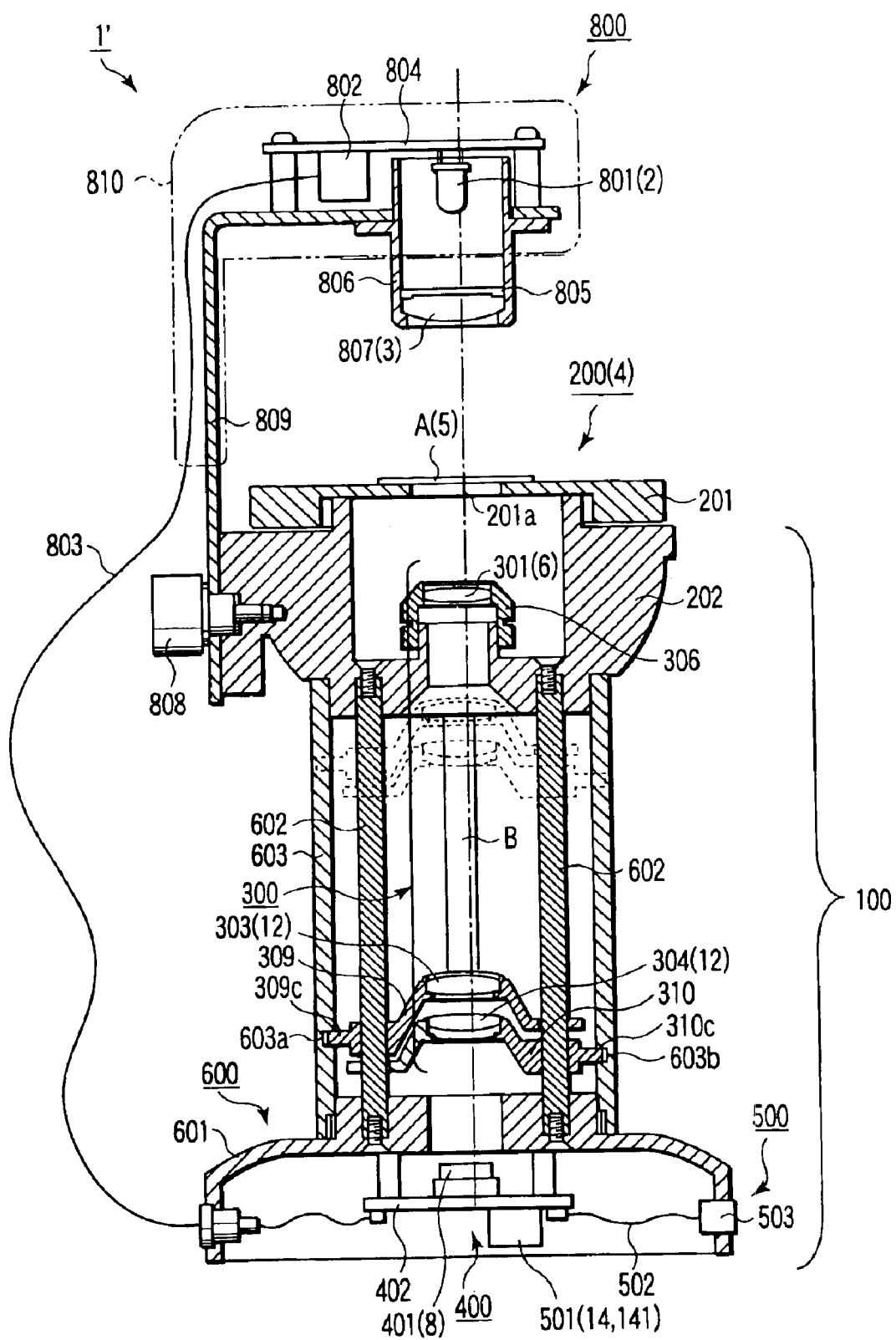
FIG. 19 is a sectional view showing the configuration of the microscope system according to a fifth embodiment of the present invention.
Figure 20:
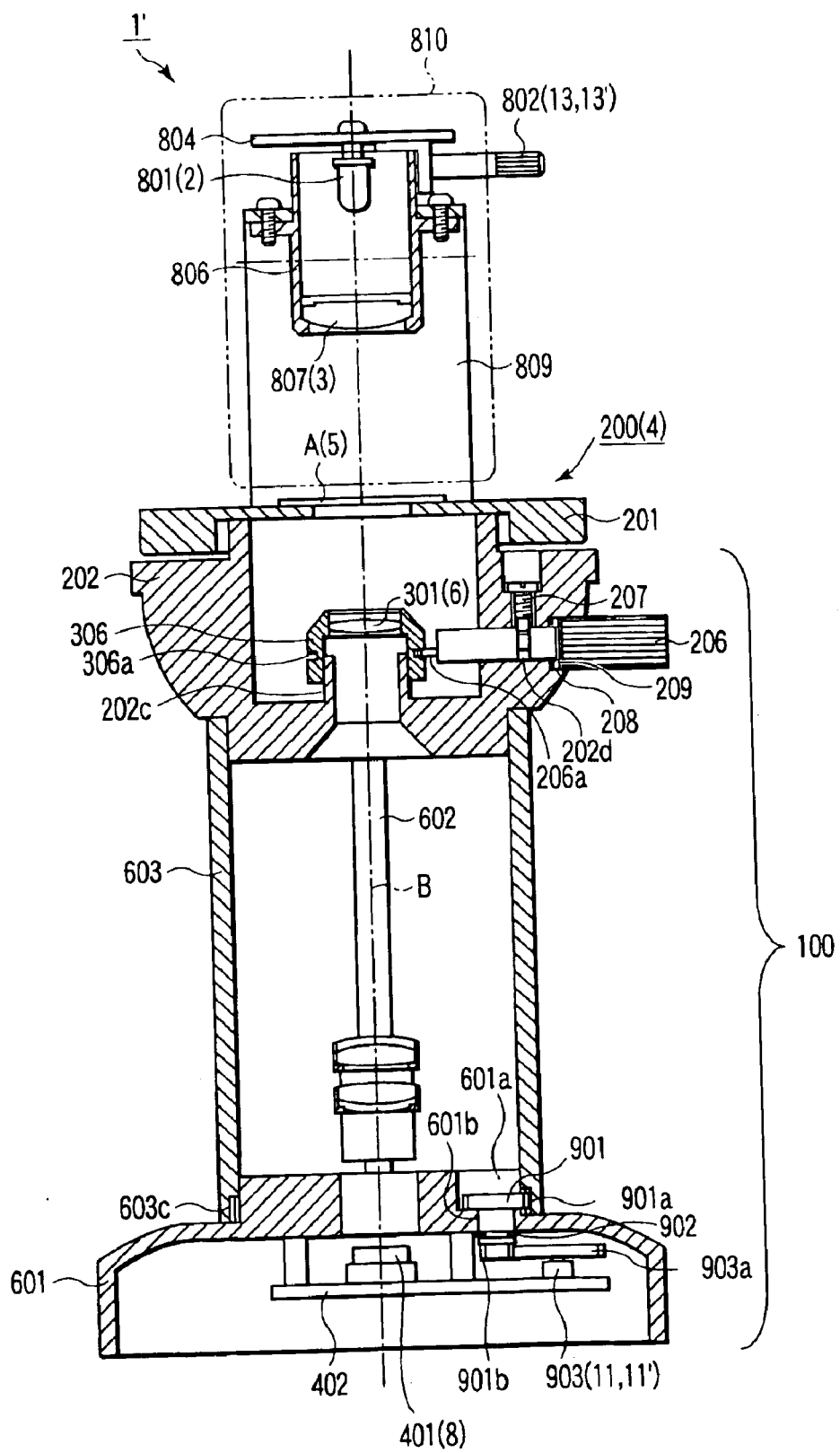
FIG. 20 is a sectional view showing the configuration of the microscope system according to the fifth embodiment of the present invention.

FIGS. 19 and 20 are sectional views showing the configuration of the microscope system according to a fifth embodiment of the present invention. A sectional direction of FIG. 19 forms 90° with that of FIG. 20.

A microscope 1' shown in FIGS. 19 and 20 is configured with: a stage portion 200 on which a sample A is laid; a light source portion 800 for illuminating the sample A; a zoom lens portion 300 for enlarging/reducing the image of the sample A laid on the stage portion 200; an image pickup portion 400 including the image pickup element which detects the image enlarged/reduced by the zoom lens portion 300; an output portion 500 which converts data of the image detected by the image pickup portion 400 to take the data into a personal computer (not shown); and a base portion 600 which supports the above-described whole configuration.

In the stage portion 200, a stage plate 201 including an opening 201a in the vicinity of an observation optical axis B is disposed on a stage receptacle 202 in a state in which the plate can move in a horizontal direction. In the zoom lens portion 300, a lens 301 held by a lens frame 306, a lens 303 held by a lens frame 309, and a lens 304 held by a lens frame 310 are linearly disposed so that the optical axes B substantially agree with one another.

The lens frame 306 is slidably fitted into a fit portion 202c disposed in the vicinity of the optical axis B of the stage receptacle 202. An eccentric pin 206a in the tip end of a focus handle 206 rotatably attached to a side surface hole 202d of the stage receptacle 202 is fitted in a groove 306a disposed in an outer periphery of the lens frame 306. It is to be noted that the focus handle 206 is rotatably held by an adequate force without coming off the stage receptacle 202 by a stopper pin 207, spring washer 208, and washer 209. As a result, when the focus handle 206 is rotated, the lens 301 moves in the optical axis B direction, and focusing onto the sample A is possible.

Figure 21A:
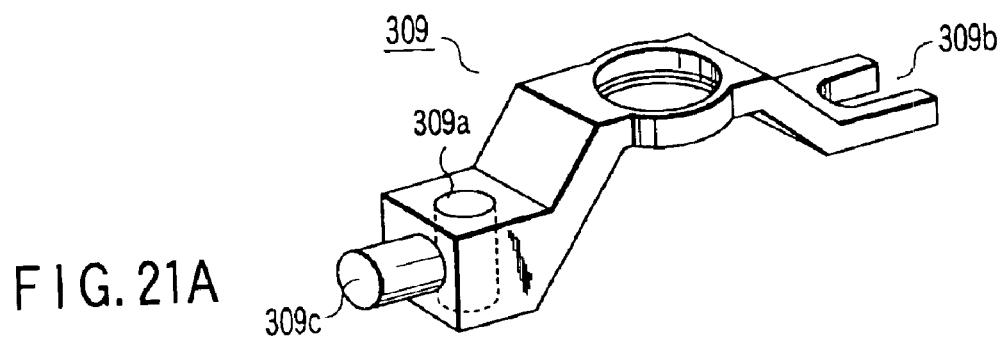
FIGS. 21A, 21B are perspective views showing the configuration of a lens frame according to the fifth embodiment of the present invention.
Figure 21B:
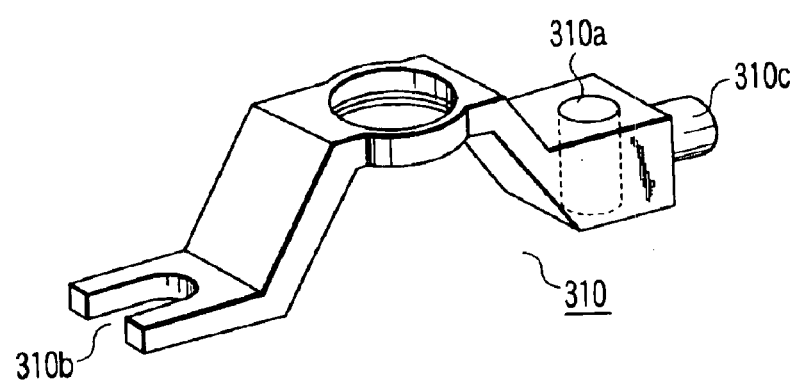

FIG. 21A is a perspective view showing the configuration of the lens frame 309, and FIG. 21B is a perspective view showing the configuration of the lens frame 310. As shown in FIGS. 21A, 21B, the lens frames 309, 310 include a fit hole 309a, fit groove 309b, and cam follower 309c, and a fit hole 310a, fit groove 310b, and cam follower 310c. The fit hole 309a and fit groove 310b are movably fitted in one of two supports 602, 602 described later, and the fit groove 309b and fit hole 310a are movably fitted in the other of two supports 602, 602 in vertical directions.

As shown in FIGS. 19, 20, two supports 602, 602 are held between the stage receptacle 202 above and a base 601 below. The rotary ring 603 having a cylindrical shape include cam grooves 603a, 603b described later inside, and is disposed to surround two supports 602, 602 and held between the stage receptacle 202 and base 601. Upper/lower end surfaces of the rotary ring 603 have a slight gap from the stage receptacle 202 and base 601. The rotary ring 603 includes upper and lower portions of an inner diameter surface which are fitted in the side surfaces of protrusions of the stage receptacle 202 and base 601, and is in a rotatable state with respect to the stage receptacle 202 and base 601. In the cam grooves 603a, 603b, the cam follower 309c of the lens frame 309, and the cam follower 310c of the lens frame 310 are fitted, and regulated.

Figure 22:
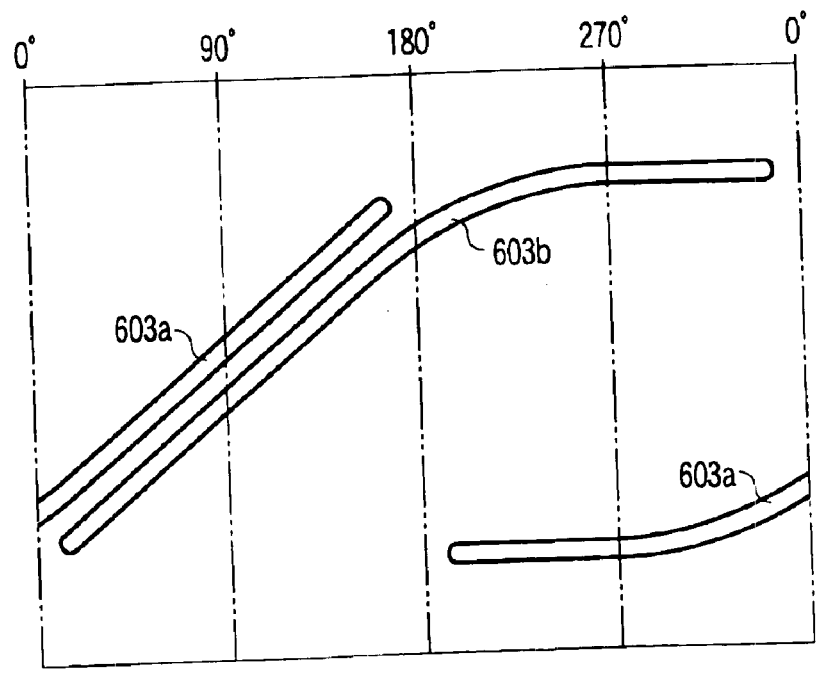
FIG. 22 is a developed view of cam grooves according to the fifth embodiment of the present invention.

FIG. 22 is a developed view of the cam grooves 603a, 603b. As shown in FIG. 22, the cam grooves 603a, 603b have shapes calculated in such a manner that the image of the sample A is enlarged or reduced by the lenses 303 and 304 and formed in focal positions of the front/back lenses. As a result, when the rotary ring 603 is rotated, the cam followers 309c, 310c regulated by the cam grooves 603a, 603b are pressurized, the lenses 303 and 304 move in the direction of the optical axis B, and the image of the sample A is enlarged or reduced.

Furthermore, an inner teeth gear 603c is disposed in an inner diameter peripheral surface of a lower port of the rotary ring 603, and this inner teeth gear 603c meshes with a large gear portion 901a of a change gear 901 rotatably attached to a fit portion 601b of a spot facing hole 601a of the base 601. A small gear portion 901b integrally disposed coaxially with the large gear portion 901a meshes with a volume gear 903a of a variable resistance 903 disposed on a circuit substrate 40, and is in a rotatable state. As a result, the resistance value of the variable resistance 903 can fluctuate at a predetermined value in accordance with the rotation angle of the rotary ring 603, and the illumination light amount of a light source 801 can be changed in accordance with the fluctuation of the magnification. It is to be noted that a C ring 902 is attached to a side surface groove under the change gear 901 to prevent the change gear 901 from coming off upwards from the fit portion 601b.

The image pickup portion 400 is configured with an image pickup element 401 which receives the light of the image of the sample A zoom-enlarged by the zoom lens portion 300, and the circuit substrate 402 having a function of processing the data of the received light image. On the circuit substrate 402, the image pickup element 401 is integrally disposed. The circuit substrate 402 is fixed to the base 601 so that an image pickup surface of the image pickup element 401 agrees with an optical focal position of the zoom lens portion 300.

The output portion 500 is configured with a processing circuit 501 integrally configured on the circuit substrate 402, and a terminal 503 such as a USB for connection to an external personal computer (not shown). The processing circuit 501 is electrically connected to the terminal 503 by a lead wire 502 so that image data output or power supply from the personal computer are possible.

The light source portion 800 includes the light source 801, a volume 802 which adjusts supply power to the light source 801, and a cable 803 for supplying power to the light source 801 from the image pickup portion 400, and these are held by a substrate 804. The light source portion 800 also includes: a condenser lens 807 for collecting an irradiated light from the light source 801 fitted/fixed in a cylindrical component 806 by a ring spring 805 onto the sample A laid on the stage portion 200; and an arm 809 which supports the substrate 804 and cylindrical component 806 and which is attached to the stage receptacle 202 by a fixing knob 808. The substrate 804 and cylindrical component 806 supported by the arm 809 are covered with an exterior cover 810. A part of the cylindrical component 806 projects out of the exterior cover 810 in order to irradiate the stage plate 201 with the irradiated light from the condenser lens 807.

It is to be noted that the microscope system of the fifth embodiment includes the light adjustment function of the above-described first to fourth embodiments, and some of the elements of FIGS. 19 and 20 correspond to those shown in FIG. 1 or the like. That is, the sample A corresponds to the subject 5, the light source 801 corresponds to the LED 2, the condenser lens 807 corresponds to the collector lens 3, the stage portion 200 corresponds to the stage 4, the lens 301 corresponds to the subject-side lens 6, the lenses 303 and 304 correspond to the zoom lens group 12, the image pickup element 401 corresponds to the CCD 8, and the processing circuit 501 corresponds to the light adjustment control portion 14 and CCD signal processing portion 141. The variable resistance 903 corresponds to the zoom volumes 11, 11'. The volume 802 corresponds to the dimmer volumes 13, 13'. It is to be noted that in FIGS. 19, 20, the lens corresponding to the image forming lens 7 is omitted.

According to the above-described configuration, when the output portion 500 is connected to the personal computer (not shown), the power is supplied to the image pickup portion 400 from the personal computer. The sample A laid on the stage plate 201 is transmitted/illuminated by the light source portion 800. A desired illumination light amount can be obtained from the light source portion 800 by the adjustment of the supply power by the volume 802. The focusing onto the sample A is performed by the focus handle 206. The image enlarged or reduced by the zoom lens portion 300 is picked up by the image pickup portion 400, and the image data is sent to the personal computer via the output portion 500.

The observation image is enlarged/reduced, when the observer rotates the rotary ring 603. At this time, the change gear 901 and volume gear 903a cooperate/rotate to fluctuate the resistance value of the variable resistance 903. The resistance value of the variable resistance 903 is inputted into the processing circuit 501.

When the magnification of the optical system is changed, the brightness of the image usually changes, and the pickedup image sometimes whitens/blackens. However, the illumination light amount of the light source 801 is adjusted in accordance with the magnification change of the zoom lens portion 300 by the control of the processing circuit 501, and the variable resistance 903 having a resistance curve is used such that the received light amount of the image pickup element 401 is in a constant range to prevent the image from whitening or blackening. Accordingly, even after the magnification change operation, the observation light amount adjusted with the volume 802 is kept in a constant range, and the brightness of the observation image is kept in the constant range.

Moreover, since the observation light amount differs with the state of the sample A, the dark sample remains dark even after the magnification change only with the variable resistance 903. In this case, the volume 802 is manually adjusted to obtain the appropriate observation light amount.

It is to be noted that the light adjustment control described in the first to fourth embodiments can be performed by the processing circuit 501 by the rotating operation of the volume 802 or the rotary ring 603.

According to the present invention, the following functions are produced.

(1) According to the microscope system of the present invention, since the light amount control of the illumination light is performed by the control synchronized with the driving pulse of the image pickup element, television observation is possible without requiring any filter or filter driving apparatus, without enlarging the system, at the low cost or without changing the color temperature even after the light adjustment in accordance with the change of the observation optical system.

(2) According to the microscope system of the present invention, the light amount of the illumination light can be changed irrespective of the zoom magnification.

(3) According to the microscope system of the present invention, even when the illuminating portion is extinguished, the image pickup element is driven. Therefore, the sunlight which is the natural energy can be used in the illumination to save power.

(4) According to the microscope system of the present invention, since lighting/extinguishing switch functions of the light adjustment portion and illuminating portion are united, secure operation of the illuminating portion is possible without performing any intricate operation.

(5) According to the microscope system of the present invention, irrespective of the rotated position of the light adjustment portion, the ratio of the change of the illumination intensity with respect to the change amount of the rotation angle of the light adjustment portion can be substantially constant, and the light adjustment operation to optimize the illumination light onto the subject can easily be performed.

(6) According to the microscope system of the present invention, the change of the illumination light intensity by the change of the zoom magnification can securely be corrected, the light adjustment operation does not have to be performed at a zoom operation time, and the microscope observation can easily be performed with a constantly appropriate illumination light amount.

Figure 23:
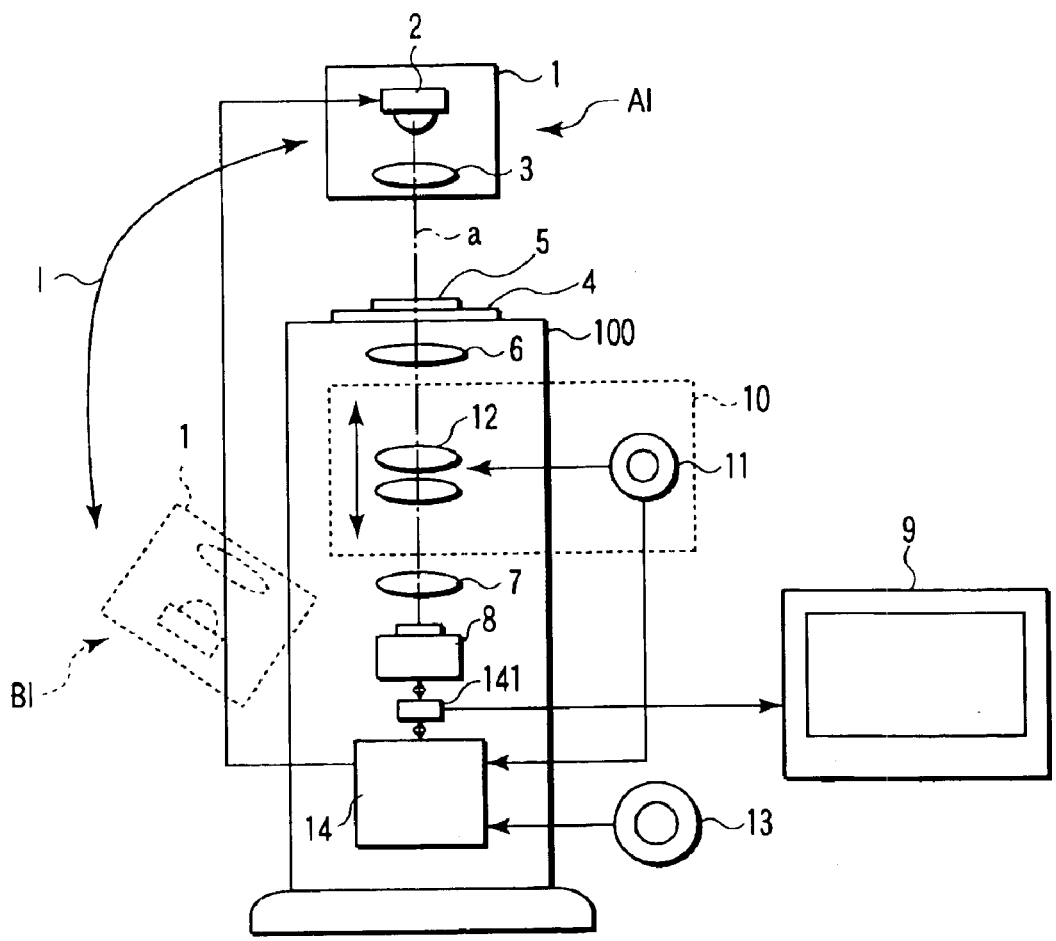
FIG. 23 is a diagram showing the whole configuration of the microscope system according to a sixth embodiment of the present invention.

FIG. 23 is a diagram showing the whole configuration of the microscope system according to a sixth embodiment of the present invention. In FIG. 23, the same components as those of FIG. 1 are denoted with the same reference numerals.

In the LED illumination unit 1, the lights emitted downwards from the LED 2 are collected by the collector lens 3 to illuminate the subject 5 fixed on the stage 4. It is to be noted that the LED illumination unit 1 can move to a position B1 from position A1 as shown by a line 1. When the LED illumination unit 1 is in the position A1, the LED illumination unit 1 is positioned opposite to the CCD 8 with respect to the subject 5, and the illumination light is transmitted through the subject 5 and incident upon the CCD 8. On the other hand, when the LED illumination unit 1 is in the position B1, the LED illumination unit 1 is disposed on the same side as that of the CCD 8 with respect to the subject 5, and a scattered light generated by irradiation of the subject 5 with the illumination light is incident upon the CCD 8. That is, the LED illumination unit 1 can move to an angle at which the illumination light for incidence observation can be emitted with respect to the subject 5.

Figure 24:
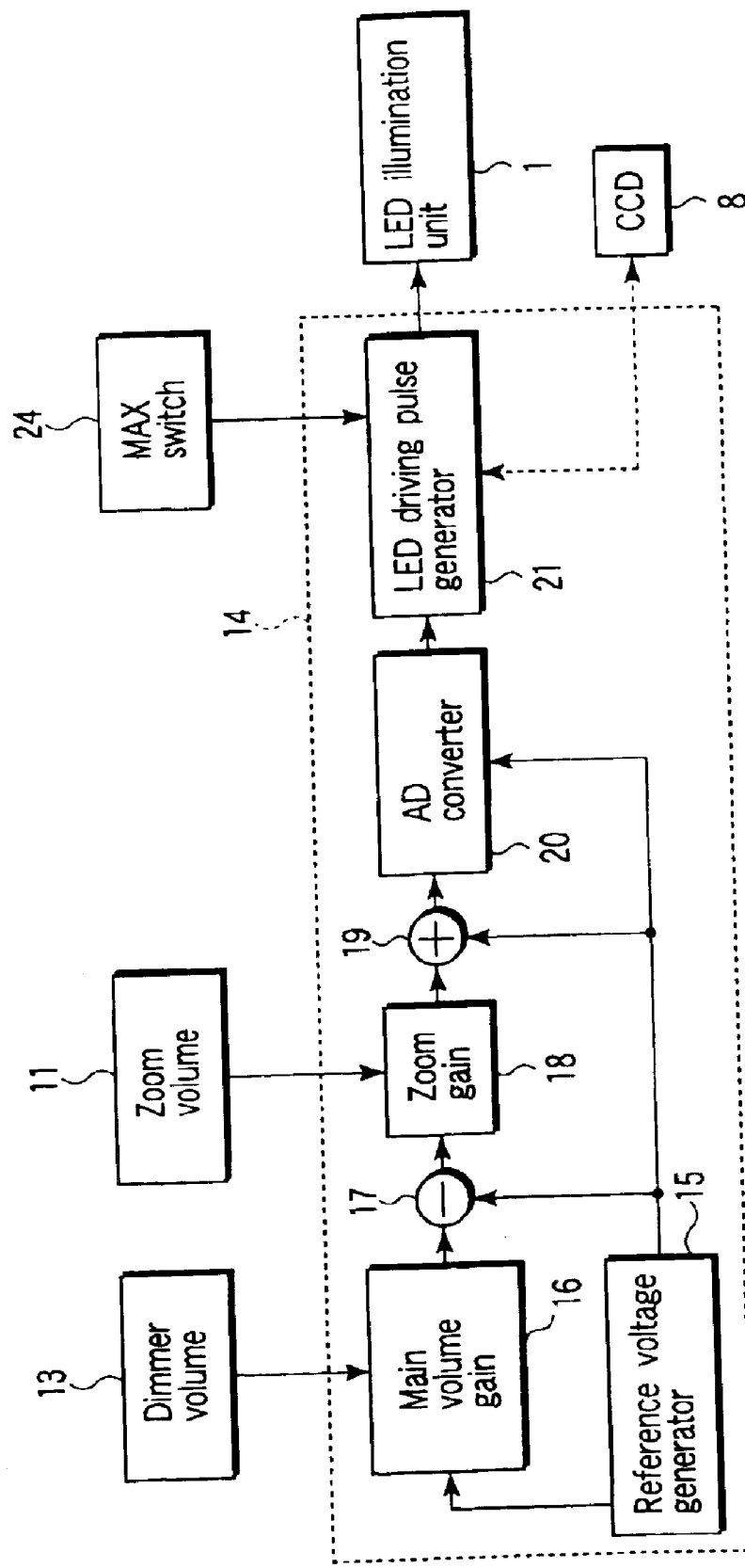
FIG. 24 is a block diagram concerning the light adjustment function of the microscope system according to the sixth embodiment of the present invention.

FIG. 24 is a block diagram concerning the light adjustment function of the microscope system. In FIG. 24 the same components as those of FIG. 3 are denoted with the same reference numerals.

The LED driving pulse generator 21 is connected to a MAX switch 24 (not shown in FIG. 23), the LED illumination unit 1, and the CCD 8. The MAX switch 24 is a switch with which the observer performs the light adjustment, and is a momentary switch which is ON when depressed and OFF in the other case.

Figure 25:
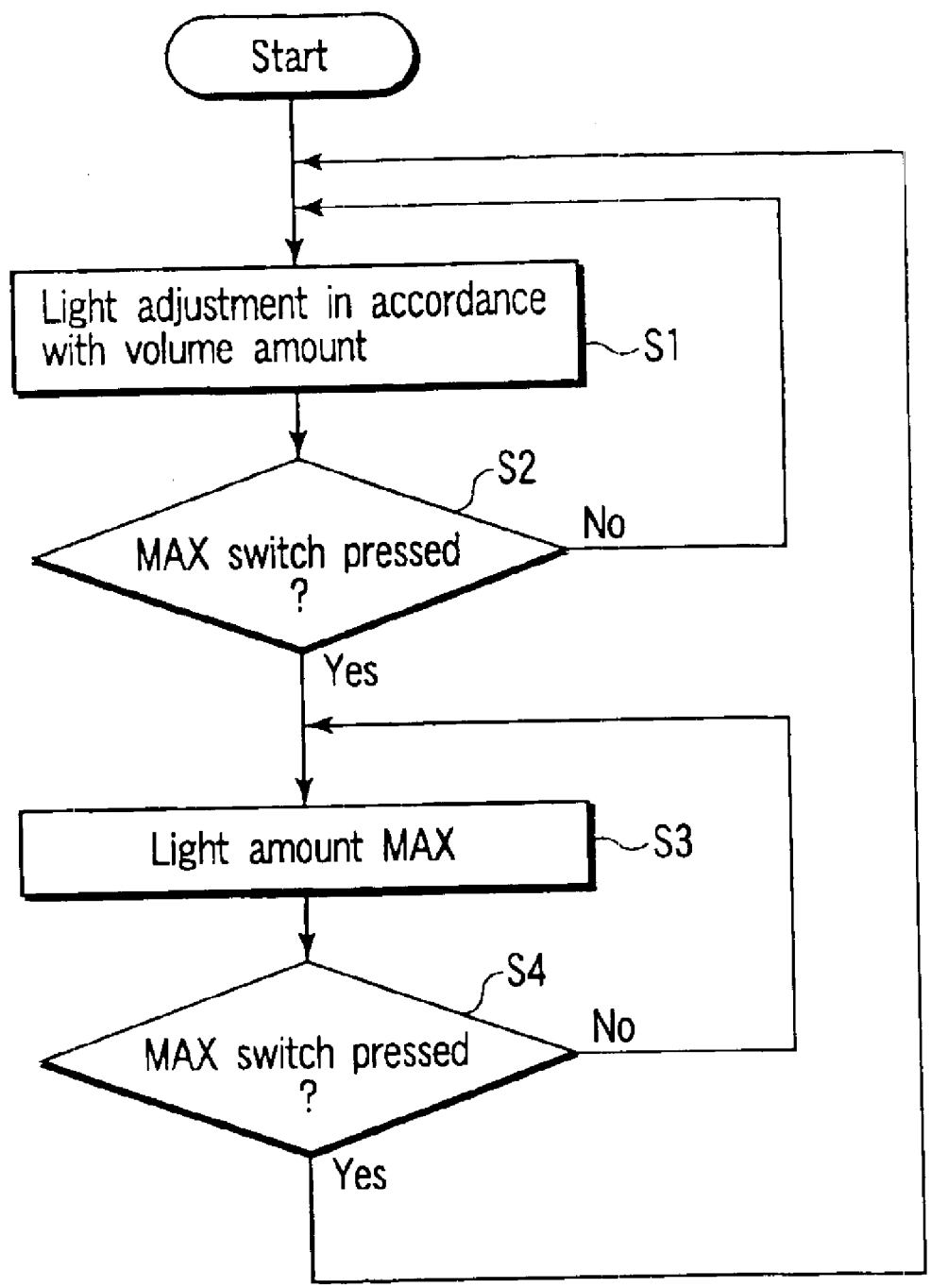
FIG. 25 is a flowchart showing an operation procedure of the microscope system according to the sixth embodiment of the present invention.

FIG. 25 is a flowchart showing an operation procedure of the microscope system configured as described above. The operation in accordance with the operation of the MAX switch 24 will be described hereinafter with reference to FIG. 25.

When the light adjustment control is performed in the light adjustment control portion 14 in accordance with the operation amounts of the dimmer volume 13 and zoom volume 11 by the observer first in step S1, and when the observer depresses the MAX switch 24 in step S2, the MAX switch 24 switches ON from OFF. In this case, in step S3, the LED driving pulse generator 21 detects that the MAX switch 24 turns ON, and controls the excitement pulse width t into the LED 2 to obtain a continuously excited state irrespective of the rotation angle of the dimmer volume 13 or zoom volume 11. Accordingly, the light is adjusted so that the LED 2 obtains a maximum light amount.

When the observer again presses the MAX switch 24 next in step S4, the MAX switch 24 switches OFF from ON. In this case, the flow returns to the step S1 to perform the light adjustment control in the light adjustment control portion 14 in accordance with the operation amounts of the dimmer volume 13 and zoom volume 11 by the observer. That is, when the dimmer volume 13 and zoom volume 11 are allowed to be variable, the excitement pulse width t into the LED 2 can continuously be varied to the maximum excitement pulse width in the continuously excited state from the minimum excitement pulse width.

In this manner, since the MAX switch 24 is disposed to maximize the light amount, and when a maximum illumination intensity is required in general at an incidence observation time, the observer can adjust the light at the maximum light amount with one button operation, and can cancel the maximum light amount of the adjusted light with one button operation without operating the dimmer volume.

Figure 26:
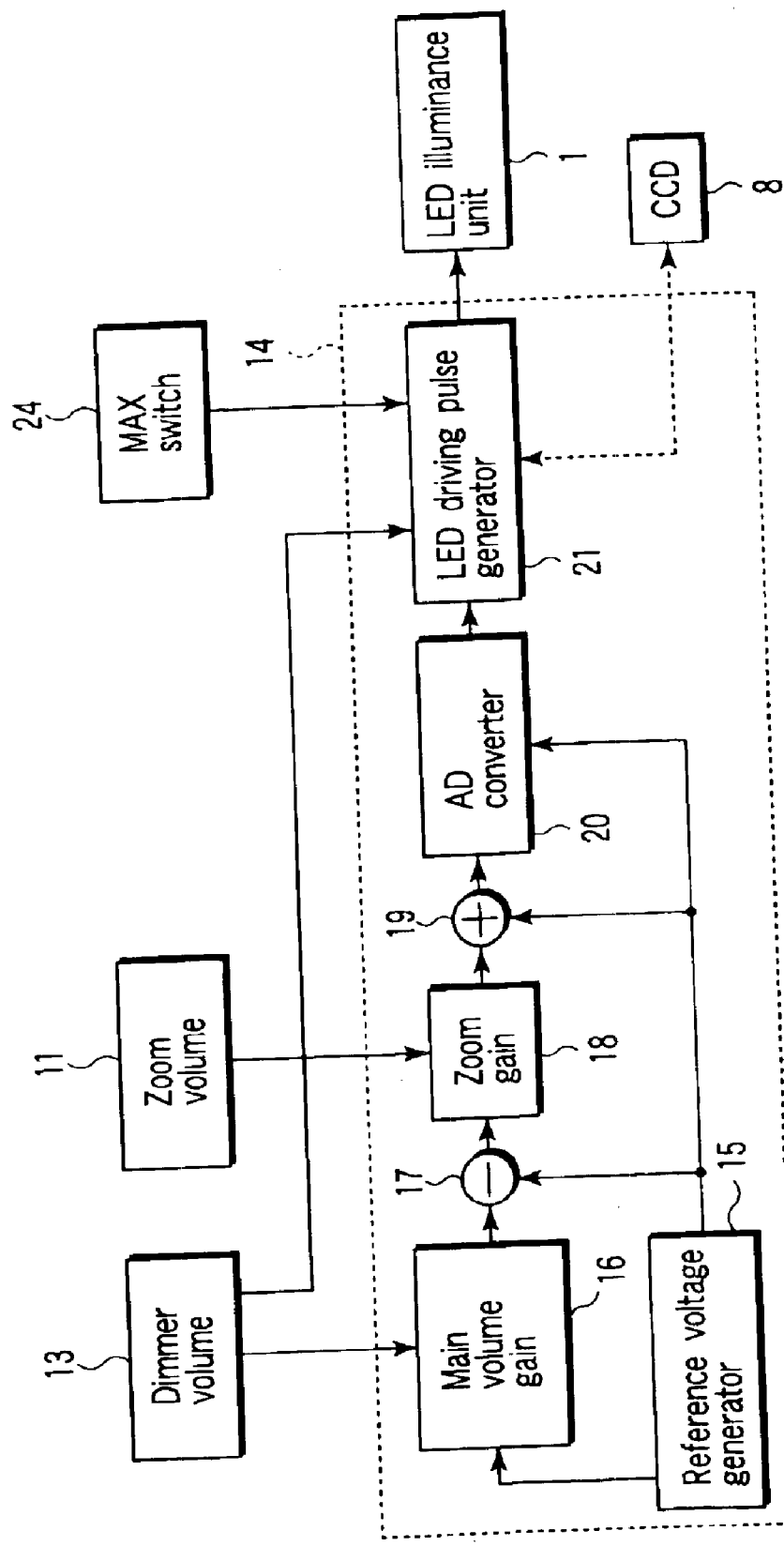
FIG. 26 is a block diagram concerning the light adjustment function of the microscope system according to a seventh embodiment of the present invention.

FIG. 26 is a block diagram concerning the light adjustment function of the microscope system according to a seventh embodiment of the present invention. In FIG. 26 the same components as those of FIG. 24 are denoted with the same reference numerals. In FIG. 26, the LED driving pulse generator 21 is connected to the dimmer volume 13.

FIG. 27 is a flowchart showing the operation procedure of the microscope system configured as described above. The operation in accordance with the operation of the MAX switch 24 will be described hereinafter with reference to FIG. 27.

When the light adjustment control is performed in the light adjustment control portion 14 in accordance with the operation amounts of the dimmer volume 13 and zoom volume 11 by the observer first in step S11, and when the observer depresses the MAX switch 24 in step S12, the MAX switch 24 switches ON from OFF. In this case, in step S13, the LED driving pulse generator 21 detects that the MAX switch 24 turns ON, and controls the excitement pulse width t into the LED 2 to obtain the continuously excited state irrespective of the rotation angle of the dimmer volume 13 or zoom volume 11. Accordingly, the light is adjusted so that the LED 2 obtains the maximum light amount.

When the observer again presses the MAX switch 24 next in step S14, the MAX switch 24 switches OFF from ON. In this case, the continuous excitation into the LED 2 is canceled, and the flow returns to the step S11 to perform the light adjustment control in the light adjustment control portion 14 in accordance with the operation amounts of the dimmer volume 13 and zoom volume 11 by the observer. When the observer does not press the MAX switch 24 in step S14, and when the observer operates the dimmer volume 13 in step S15, the flow returns to step S11 to perform the light adjustment control in the light adjustment control portion 14 in accordance with the operation amounts of the dimmer volume 13 and zoom volume 11 by the observer.

In this manner, even in a state in which the observer operates the MAX switch 24 to bring the adjusted light into the maximum light amount, when the dimmer volume 13 is operated, the dimmer volume is prioritized in performing the light adjustment. Accordingly, the microscope observation can be realized with a simple operation without requiring the maximum light amount.

Figure 28:
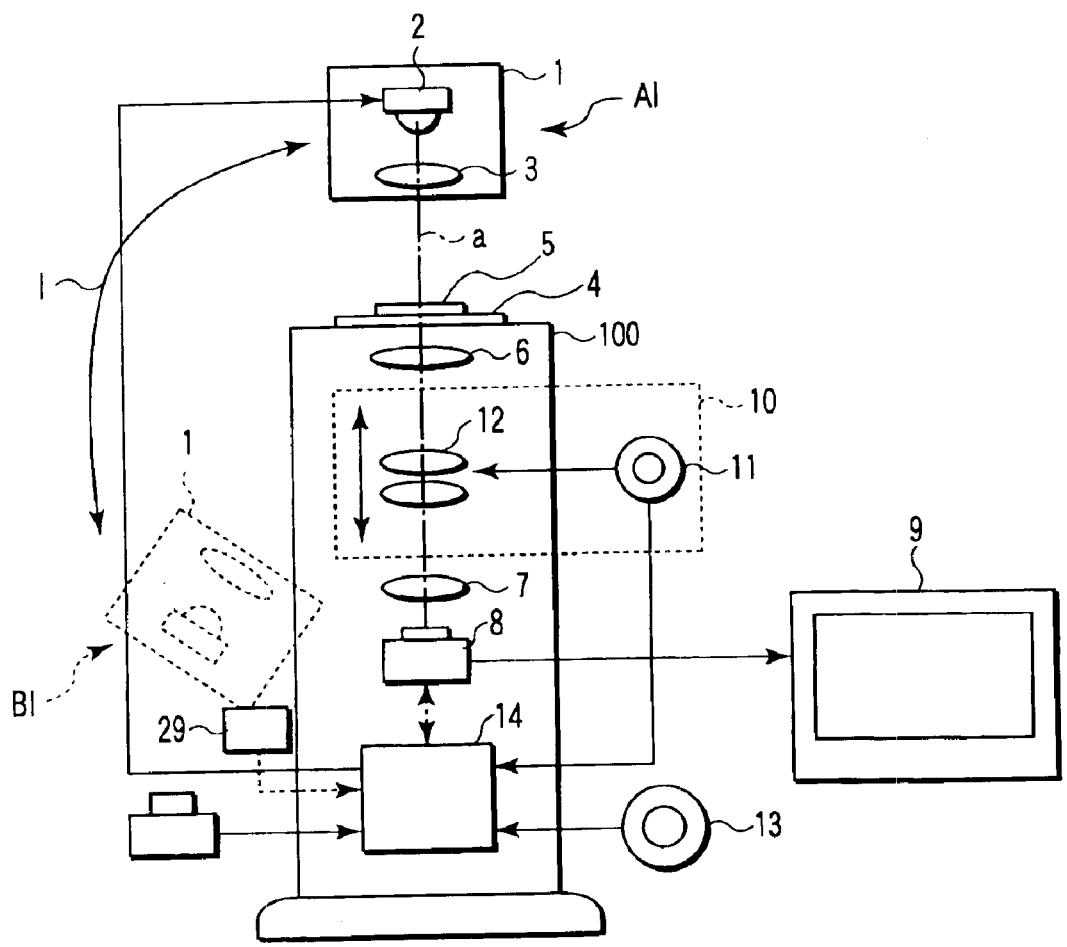
FIG. 28 is a diagram showing the whole configuration of the microscope system according to an eighth embodiment of the present invention.

FIG. 28 is a diagram showing the whole configuration of the microscope system according to an eighth embodiment of the present invention. In FIG. 28, the same components as those of FIG. 23 are denoted with the same reference numerals. As described in the sixth embodiment, the LED illumination unit 1 can move to the position B1 from the position A1 as shown by the line 1, and the LED illumination unit 1 can move to the position where so-called incidence observation is possible on the same side as that of the CCD 8 with respect to the subject 5.

An illumination angle detection sensor 29 is a sensor to detect whether or not the LED illumination unit 1 is in a position where the incidence illumination is possible, comprises a photo interrupter, and is connected to the light adjustment control portion 14. The illumination angle detection sensor 29 outputs an "H" signal, when the LED illumination unit 1 is in the position where the incidence illumination is possible, that is, in a position B, and outputs an "L" signal, when the unit is in another position.

FIG. 29 is a block diagram concerning the light adjustment function of the microscope system. In FIG. 29 the same components as those of FIGS. 24 and 26 are denoted with the same reference numerals. In FIG. 29, the LED driving pulse generator 21 is connected to the dimmer volume 13 and illumination angle detection sensor 29.

Figure 30:
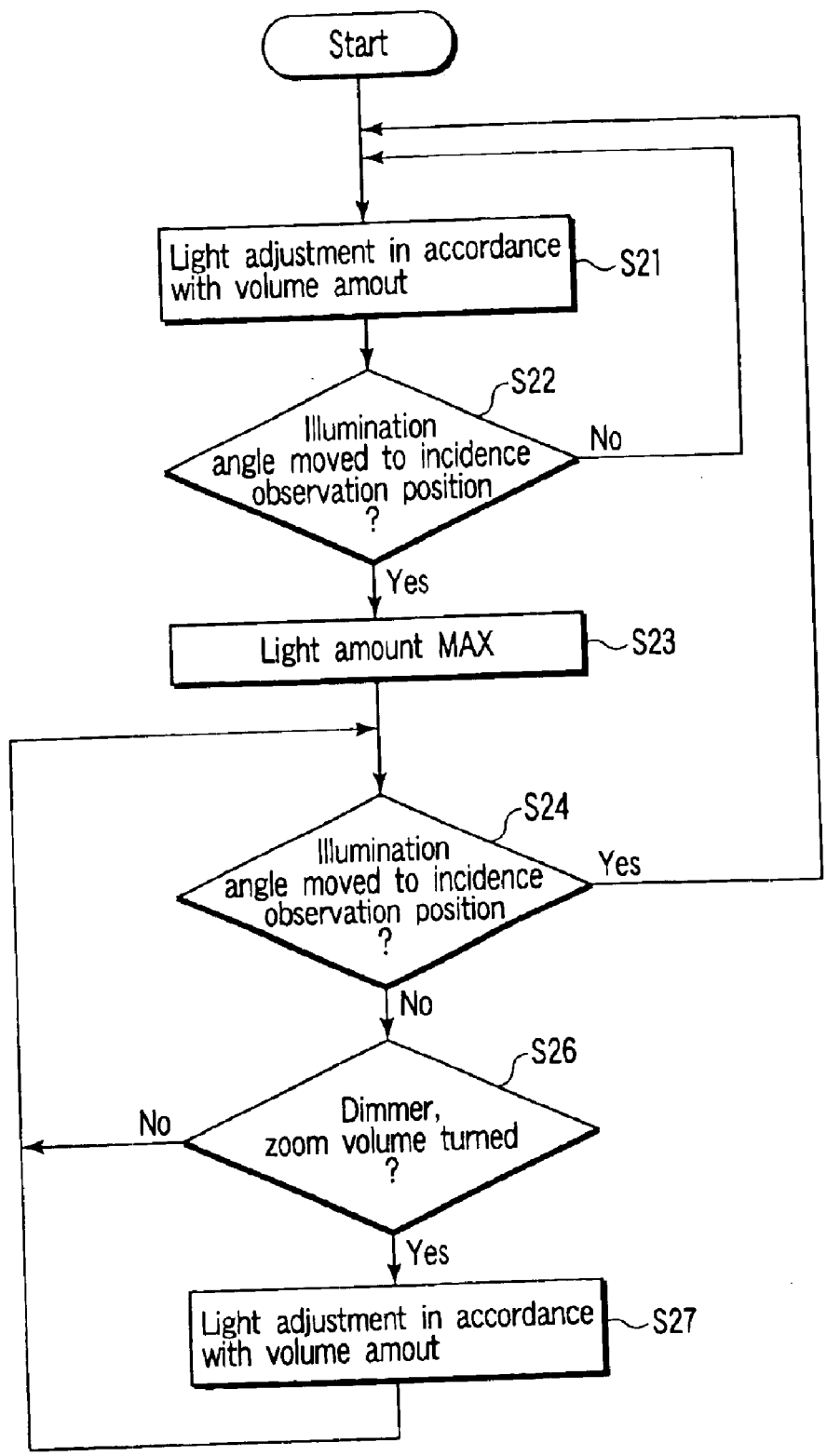
FIG. 30 is a flowchart showing the operation procedure of the microscope system according to the eighth embodiment of the present invention.

FIG. 30 is a flowchart showing the operation procedure of the microscope system configured as described above. An operation in accordance with the movement of the LED illumination unit 1 will be described hereinafter with reference to FIG. 30.

First in step S21, the light adjustment control is performed in the light adjustment control portion 14 in accordance with the operation amounts of the dimmer volume 13 and zoom volume 11 by the observer. At this time, in step S22, the observer moves the LED illumination unit 1 to a position (B) where the incidence illumination is possible. Then, the illumination angle detection sensor 29 outputs the "H" signal. In this case, in step S23, the LED driving pulse generator 21 inputs the "H" signal, and controls the excitement pulse width t into the LED 2 so as to obtain the continuously excited state irrespective of the rotation angles of the dimmer volume 13 and zoom volume 11. Accordingly, the light adjustment is performed so that the LED 2 obtains the maximum light amount.

Next in step S24, the observer moves the LED illumination unit 1 from the position (B) where the incidence illumination is possible, and the illumination angle detection sensor 29 outputs the "L" signal. In this case, the LED driving pulse generator 21 inputs the "L" signal. Subsequently, the flow returns to step S21 to perform the light adjustment control in the light adjustment control portion 14 in accordance with the operation amounts of the dimmer volume 13 and zoom volume 11 by the observer.

Moreover, in the step S24, the LED illumination unit 1 is not moved from the position (B) where the incidence illumination is possible. In this case, when the observer operates the dimmer volume 13 or the zoom volume 11 in step S26, the light adjustment control is performed in the light adjustment control portion 14 in accordance with the operation amount in step S27.

In this manner, the maximum illumination intensity is generally required as in the incidence observation time. In this case, the observer simply moves the LED illumination unit 1 to the position where the incidence illumination is possible. Then, without operating the volume, the light can be adjusted to obtain the maximum light amount. Moreover, the LED illumination unit 1 is simply removed from the position where the incidence illumination is possible. Then, the light adjustment of the maximum light amount can be cancelled, and the light adjustment in which the volume is prioritized can be returned. Accordingly, the microscope observation including the change of the illuminating method can be realized with a simple operation.

Figure 31:
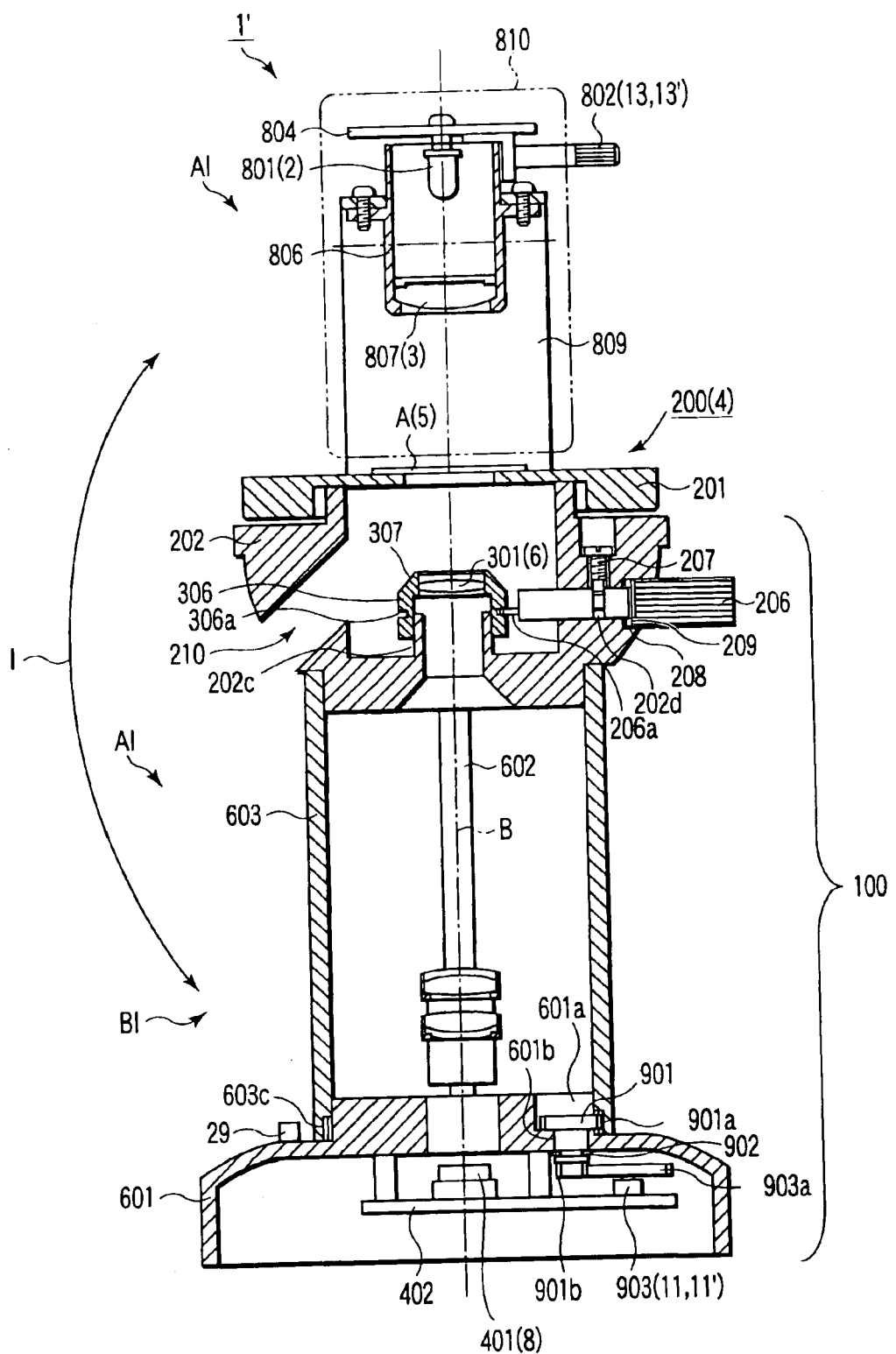
FIG. 31 is a sectional view showing the configuration of the microscope system according to a ninth embodiment of the present invention.

FIG. 31 is a sectional view showing the configuration of the microscope system according to a ninth embodiment of the present invention. In FIG. 31 the same components as those of FIG. 20 are denoted with the same reference numerals. It is to be noted that FIG. 31 forms 90° in the sectional direction with the sectional view of FIG. 19.

As described in the eighth embodiment, the illumination angle detection sensor 29 shown in FIG. 31 is a sensor to detect whether or not a light source portion 800 (corresponding to the LED illumination unit 1) is in the position where the incidence illumination is possible, and comprises the photo interrupter and the like. The illumination angle detection sensor 29 is disposed on the base 601, and is connected to the processing circuit 501. The arm 809 is rotatably attached to the stage receptacle 202 by the fixing knob 808 shown in FIG. 19. The light source portion 800 is rotated together with the arm 809 using the fixing knob 808 as a supporting point, can accordingly move to a position B1 from a position A1 as shown by the line 1, and can move to the position where the so-called incidence observation is possible on the same side with respect to the sample A. Since the incidence illumination is performed in the position B1 by the light source portion 800, a transmission hole 210 is disposed to transmit the illumination light from the light source portion 800. It is to be noted that the illumination angle detection sensor 29 may be disposed on the arm 809, not on the base 601. Even in this case, the sensor can similarly detect whether or not the light source portion 800 is in the position where the incidence illumination is possible. A hall element may also be used as the illumination angle detection sensor 29.

According to the present invention, the following functions are produced.

(1) According to the microscope system of the present invention, since the light amount control of the illumination light is performed by the control synchronized with the driving pulse of the image pickup element, the television observation is possible without requiring any filter or filter driving apparatus, without enlarging the system, at the low cost or without changing the color temperature even after the light adjustment in accordance with the change of the observation optical system. When the maximum illumination intensity is generally required as in the incidence observation time, the microscope observation is possible with the simple operation without operating the volume.

(2) According to the microscope system of the present invention, it is possible to execute different observation methods by the single illuminating portion, and a low cost system can be provided.

(3) According to the microscope system of the present invention, the maximum light amount of the illumination light can easily be canceled, and it is possible to realize the microscope observation with the simple operation.

(4) According to the microscope system of the present invention, when the illumination angle is set for the incidence observation, the illumination intensity is automatically maximized. When the angle is returned to the illumination angle for transmission observation, the illumination intensity automatically returns to the original intensity. Therefore, the microscope observation can be realized with the simple operation.

Figure 32:
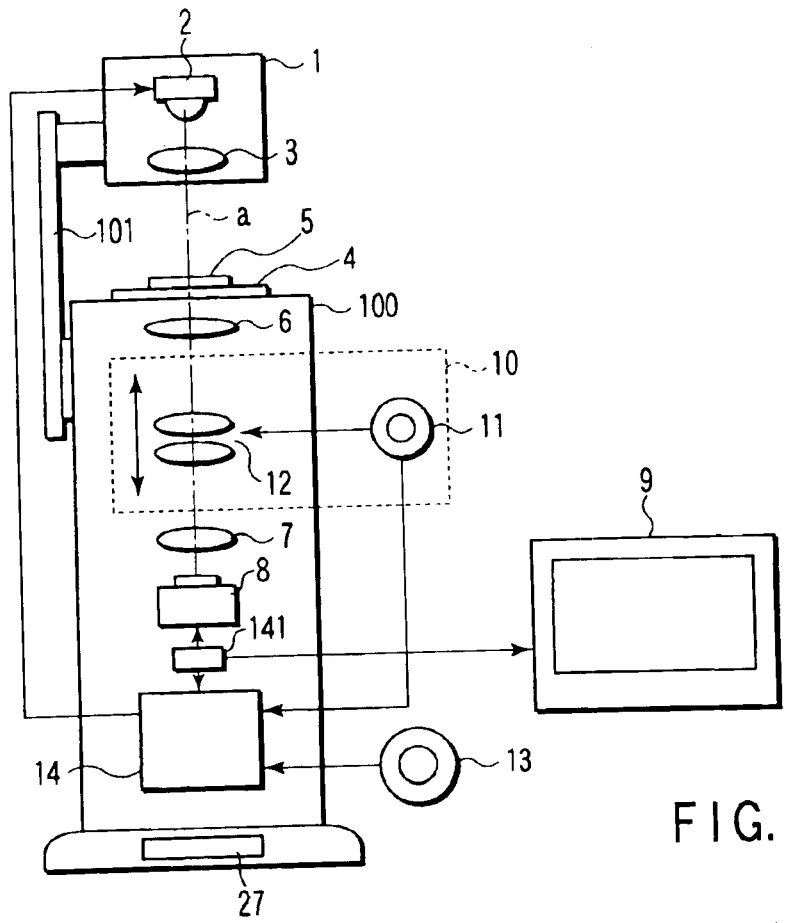
FIG. 32 is a diagram showing the whole configuration of the microscope system according to a tenth embodiment of the present invention.

FIG. 32 is a diagram showing the whole configuration of the microscope system according to a tenth embodiment of the present invention. In FIG. 32, the same components as those of FIG. 1 are denoted with the same reference numerals.

As shown in FIG. 32, above the microscope main body 100, the LED illumination unit 1 is disposed via a support arm 101 (arm 809) which extends in a vertical direction. The lower portion of the microscope main body 100, an adjusted light state display level meter 27 described later is disposed.

FIG. 33 is a block diagram concerning the light adjustment function of the microscope system. In FIG. 33, the same components as those of FIG. 3 are denoted with the same reference numerals.

As shown in FIG. 33, an adjusted light state display unit 25 includes an LED control system 26 and the adjusted light state display level meter 27. The LED control system 26 is connected to the A/D converter 20 of the light adjustment control portion 14. The LED control system 26 is connected to the adjusted light state display level meter 27. The LED control system 26 sets a display level based on the digital signal inputted from the A/D converter 20.

Figure 34:
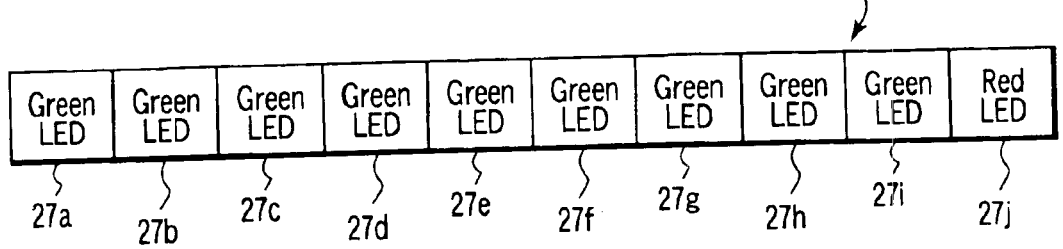
FIG. 34 is a diagram showing the schematic configuration of an adjusted light state display level meter according to the tenth embodiment of the present invention.

FIG. 34 is a diagram showing the schematic configuration of the adjusted light state display level meter 27. As shown in FIG. 34, the adjusted light state display level meter 27 comprises ten LEDs 27a to 27j which are arranged horizontally in one line and the LEDs can be controlled turning ON/OFF. These LEDs 27a to 27j are lit/extinguished independently of one another by the control of the LED control system 26. For the LEDs 27a to 27j, nine LEDs 27a to 27i from a left end are lit in green, and the LED 27j in a right end is lit in red. The adjusted light state display unit 25 is disposed at the lower part of the microscope main body 100 so that displayed content of the adjusted light state display level meter 27 can be seen from the outside.

Figure 35:
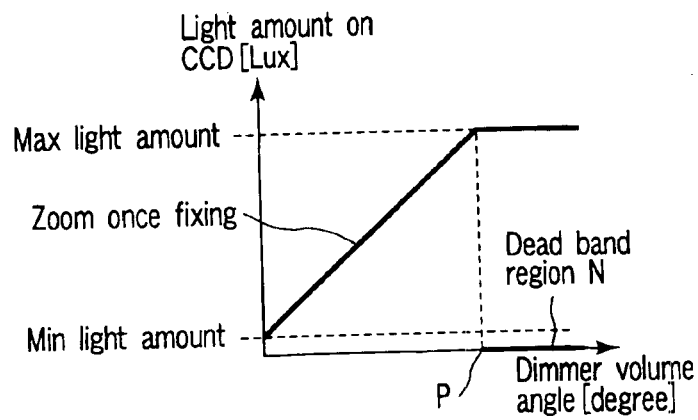
FIG. 35 is a diagram showing a relation between the rotation angle of the dimmer volume and the light amount of the LED (light amount on the CCD) according to the tenth embodiment of the present invention.

FIG. 35 is a diagram showing a relation between the rotation angle of the dimmer volume 13 and the light amount of the LED 2 (light amount on the CCD 8). As apparent from FIG. 35, when the rotation angle of the dimmer volume 13 is allowed to be variable, it is possible to continuously perform the light adjustment control in a range of Min light amount to Max light amount for the light amount of the illumination light by the LED 2. In this case, the LED driving pulse of the LED 2 is synchronized with the period T of the CCD driving pulse. Therefore, even when the light adjustment of the LED 2 is performed, the color temperature does not change. The light adjustment can be performed so that the observation is possible in the TV monitor 9. In FIG. 35, the rotation angle of the dimmer volume 13 is fixed at a maximum angle P. When the dimmer volume 13 is rotated by further angle, the region shifts to a dead band region N, and the light adjustment control is not performed at all.

Next, the operation of the adjusted light state display unit 25 will be described. When the observer rotates/operates both or either of the zoom volume 11 and dimmer volume 13, the digital value outputted from the A/D converter 20 changes. By the output from the A/D converter 20, the display state of the adjusted light state display level meter 27 changes via the LED control system 26.

Figure 36A:
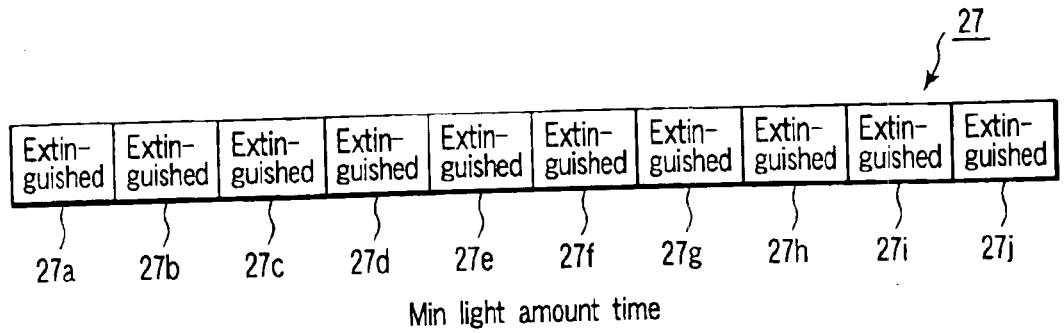
FIGS. 36A, 36B, 36C are diagrams showing a display state of the adjusted light state display level meter according to the tenth embodiment of the present invention.
Figure 36B:
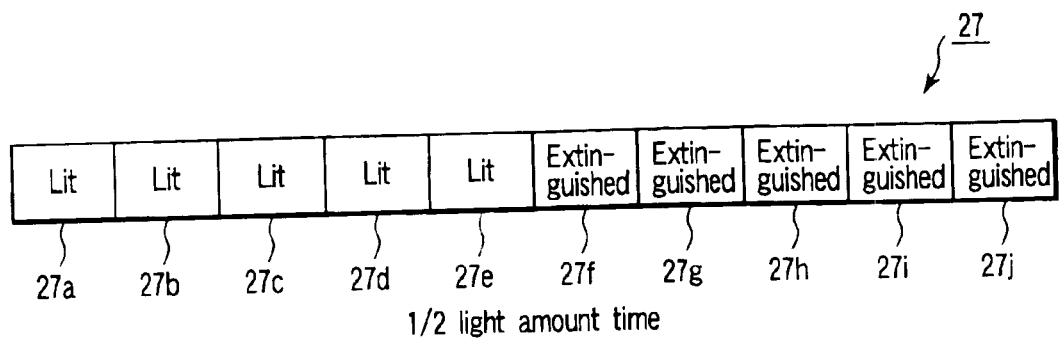
Figure 36C:
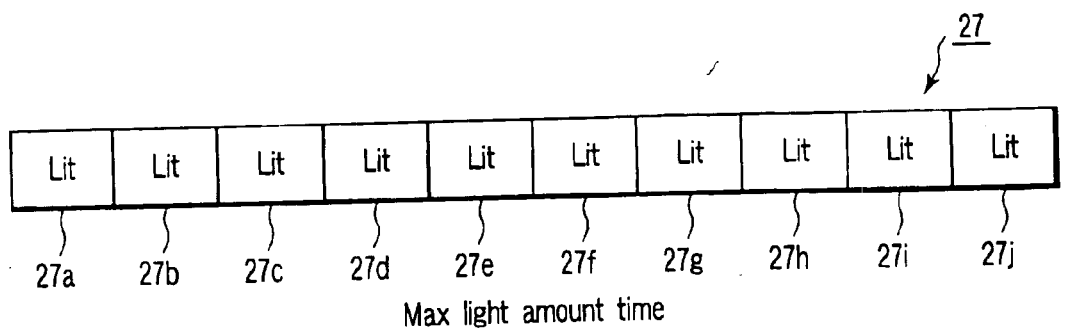

FIGS. 36A, 36B, 36C are diagrams showing the display state of the adjusted light state display level meter 27.

FIG. 36A shows the display state of the adjusted light state display level meter 27, when the light amount of the LED 2 of the LED illumination unit 1 indicates Min light amount. The LEDs 27a to 27j are all in an extinguished (OFF) state.

FIG. 36B shows the display state of the adjusted light state display level meter 27, when the light amount of the LED 2 of the LED illumination unit 1 indicates ½ light amount ((Max light amount−Min light amount)/2). The five from the left end in the LEDs 27a to 27j, that is, the LEDs 27a to 27e are in a lit (ON) state, and the other LEDs 27f to 27j are in the extinguished (OFF) state.

FIG. 36C shows the display state of the adjusted light state display level meter 27, when the light amount of the LED 2 of the LED illumination unit 1 indicates Max light amount. The LEDs 27a to 27j are all in the lit (ON) state. In this case, the LED 27j has a display color (red light) different from that of the other LEDs 27a to 27i so that the Max light amount state can easily be recognized.

Moreover, when the observer confirms the display state of the adjusted light state display level meter 27, the observer can quickly recognize the state of the LED light adjustment.

Moreover, the observer operates the dimmer volume 13 by the rotation angle which is not less than the maximum angle P as shown in FIG. 35. Then, the region shifts to the dead band region N where the light amount of the illumination light by the LED 2 does not change. This indicates that the existing state is the Max light amount, is represented by the display of the adjusted light state display level meter 27, and can be informed to the observer beforehand.

In this manner, when the light adjustment control of the illumination light is performed together with the observation method of the microscope, the state of the light adjustment control can quickly be informed to the observer. Accordingly, the observer constantly grasps the existing state, and can perform the secure light adjustment control with a sense of security.

Moreover, even in a light adjustment dead band state in which the adjustment of the light amount is impossible, this can be notified to the observer in advance. Therefore, unnecessary uneasiness can be prevented from being given to the observer for this cause.

In the above-described tenth embodiment, as the adjusted light state display level meter 27 of the adjusted light state display unit 25, ten LEDs 27a to 27j arranged horizontally in one row are used, but the adjusted light state can be displayed in numerical values.

Figure 37:
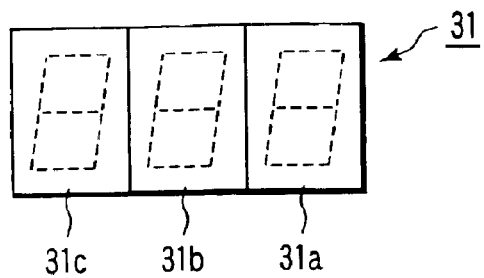
FIG. 37 is a diagram showing a modification example of the adjusted light state display level meter according to the tenth embodiment of the present invention.

FIG. 37 is a diagram showing a modification example of the adjusted light state display level meter. An adjusted light state display level meter 31 of FIG. 37 is disposed in the adjusted light state display unit 25 instead of the adjusted light state display level meter 27.

The adjusted light state display level meter 31 is configured with three 7SEG type LEDs 31a, 31b, 31c which can display numeric values indicating first, second, and third digits. These 7SEG type LEDs 31a, 31b, 31c can display numeric values of 000 to 999.

Figure 38A:
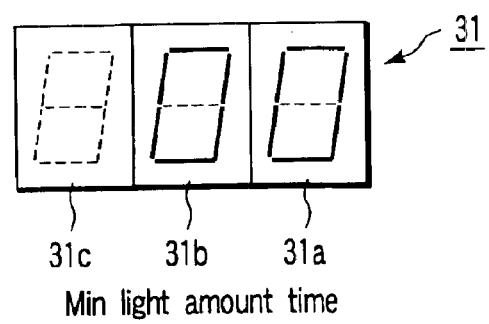
FIGS. 38A, 38B, 38C are diagrams showing the display state of the adjusted light state display level meter according to the modification example of the tenth embodiment of the present invention.
Figure 38B:
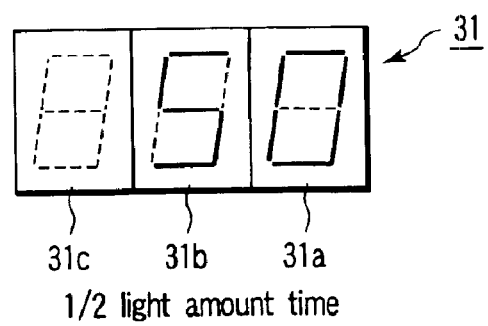
Figure 38C:
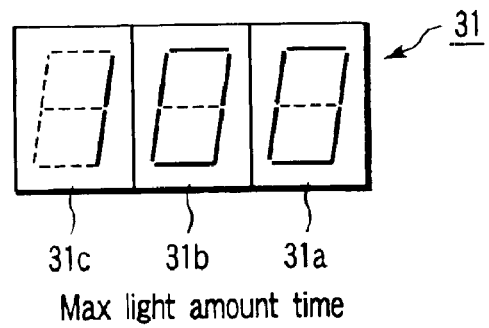

FIGS. 38A, 38B, 38C are diagrams showing the display state of the adjusted light state display level meter 31.

FIG. 38A shows the display state of the adjusted light state display level meter 31, when the light amount of the LED 2 of the LED illumination unit 1 indicates the Min light amount. The 7SEG type LEDs 31a, 31b indicating the first and second digits display "0" "0", respectively, and the adjusted light state display level meter 31 displays "00".

FIG. 38B shows the display state of the adjusted light state display level meter 31, when the light amount of the LED 2 of the LED illumination unit 1 indicates the ½ light amount ((Max light amount−Min light amount)/2). The 7SEG type LEDs 31a, 31b indicating the first and second digits display "0" "5", respectively, and the adjusted light state display level meter 31 displays "50".

FIG. 38C shows the display state of the adjusted light state display level meter 31, when the light amount of the LED 2 of the LED illumination unit 1 indicates the Max light amount. The 7SEG type LEDs 31a, 31b, 31c indicating the first, second, and third digits display "0" "0" "1", respectively, and the adjusted light state display level meter 31 displays "100".

The observer sees the displayed content of the adjusted light state display level meter 31 in this manner. Accordingly, even when the zoom volume 11 and dimmer volume 13 are operated to perform the LED light adjustment, the state of the LED light adjustment at this time can easily be recognized.

It is to be noted that in order to raise a warning property at the Max light amount time, the display color of the 7SEG type LED 31c indicating the second digit for use only at the Max light amount time is set to be different from that of the other 7SEG type LEDs 31a, 31b. Alternatively, at the Max light amount time, the displays of the 7SEG type LEDs 31a, 31b, 31c may also be allowed to blink.

FIG. 39 is a block diagram concerning the modification example of the light adjustment function of the microscope system. In FIG. 39, the same components as those of FIG. 33 are denoted with the same reference numerals.

As shown in FIG. 39, the dimmer volume 13 is connected to a dimmer switch 32, and the dimmer switch 32 is connected to the LED driving pulse generator 21.

Figure 40:
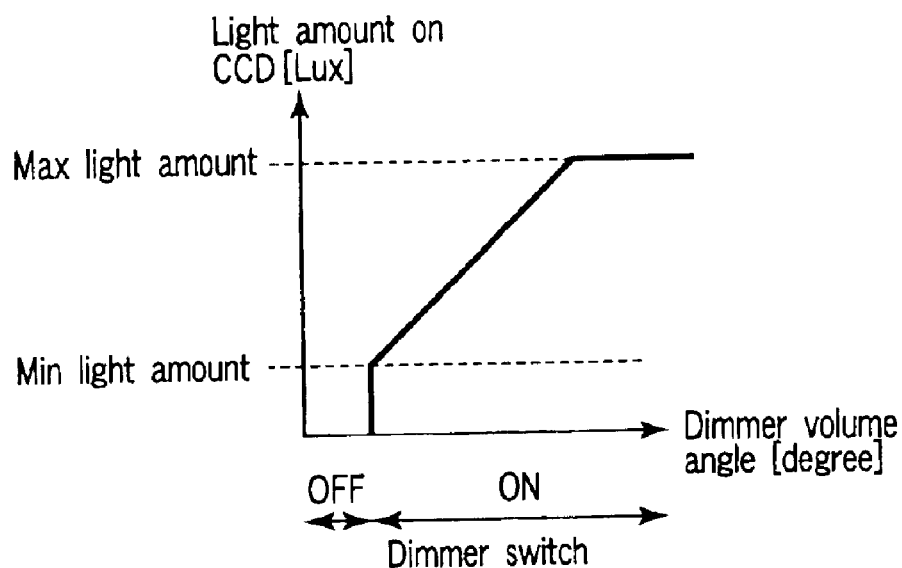
FIG. 40 is a diagram showing the relation between the rotation angle of the dimmer volume and the light amount of the LED (light amount on the CCD) according to the modification example of the tenth embodiment of the present invention.

FIG. 40 is a diagram showing the relation between the rotation angle of the dimmer volume 13 and the light amount of the LED 2 (light amount on the CCD 11). The dimmer switch 32 is integral with the dimmer volume 13. As shown in FIG. 40, when the dimmer volume 13 is operated in a region of a resistance value of 0 or more, and the light amount on the CCD 11 is adjusted between the Min light amount and the Max light amount, the dimmer switch 32 is brought into ON state. The dimmer volume 13 is rotated/operated in a direction in which the resistance value is further lowered from the state of the resistance value of 0, and the dimmer switch 32 is then brought into OFF state. When the dimmer switch 32 is OFF, the generation of the LED driving pulse from the LED driving pulse generator 21 is forcibly stopped.

According to the configuration, when the dimmer volume 13 is operated in a region having a resistance value of 0 or more, and the dimmer switch 32 is brought into the ON state, in the same manner as described in the first embodiment, it is possible to continuously adjust/control the light amount of the LED 2 in a range of the Max light amount from the Min light amount in accordance with the rotation angle of the dimmer volume 13.

When the dimmer volume 13 is operated further in a resistance value lowering direction from the state of the resistance value of 0, the dimmer switch 32 is brought in the OFF state. Then, the generation of the LED driving pulse from the LED driving pulse generator 21 is forcibly stopped, and the light adjustment of the LED 2 is stopped. When the dimmer volume 13 is operated, and the resistance value is reset to 0 or more, the dimmer switch 32 is brought into the ON state. Then, the LED driving pulse generator 21 outputs the LED driving pulse again, and the light amount of the LED 2 can continuously be adjusted/controlled in the range of the Max light amount from the Min light amount.

Here, when the adjusted light state display level meter 31 shown in FIG. 37 is used, and the dimmer switch 32 is ON, the 7SEG type LEDs 31a, 31b, 31c display numeric values of 0 to 100. On the other hand, when the dimmer switch 32 is OFF, the light adjustment of the LED 2 is stopped, and the 7SEG type LEDs 31a, 31b, 31c display nothing. Accordingly, the observer can recognize ON, OFF of the light adjustment of the LED 2 through the adjusted light state display level meter 31.

With the operation of the dimmer volume 13 in the direction in which the resistance value is further lowered from the state of the resistance value of 0 in this manner, this state can be recognized through the adjusted light state display level meter 31. Therefore, the observer can perform the secure light adjustment control of the LED 2 with the sense of security.

As a modification example of the adjusted light state display unit 25 of the microscope system, the adjusted light state display level meter 27 may be configured with only one LED. In this case, the LED is lit only at the Max light amount time, and extinguished in the other state.

In this manner, one LED of the adjusted light state display level meter 27 is lit only at the Max light amount time. Accordingly, a warning indicating the shift to the dead band region in which the light amount of the illumination light by the LED 2 does not change can be issued to the observer. Therefore, the warning property in the adjusted light state display level meter 27 is improved. Since the number of LEDs for use as the adjusted light state display level meter 27 can largely be reduced, the cost can be reduced. Furthermore, an attaching space of the adjusted light state display unit 25 into the microscope main body 100 can also largely be reduced.

Figure 41:
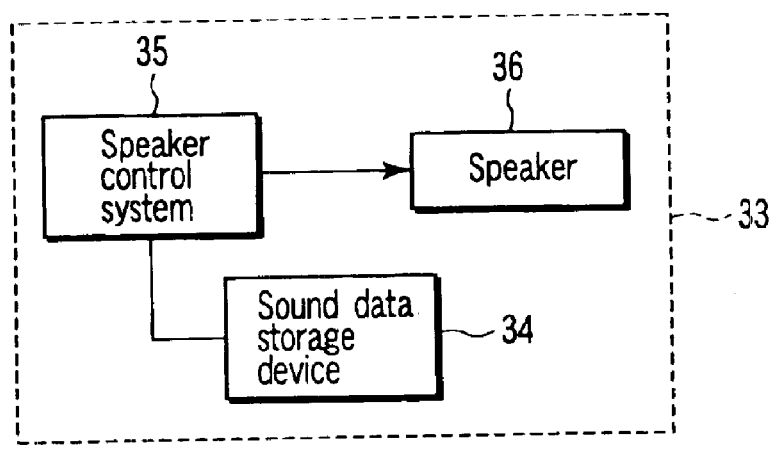
FIG. 41 is a block diagram showing the configuration of an adjusted light state sounding unit according to an eleventh embodiment of the present invention.

FIG. 41 is a block diagram showing the configuration of the adjusted light state sounding unit according to an eleventh embodiment of the present invention. An adjusted light state sounding unit 33 shown in FIG. 41 is disposed instead of the adjusted light state display unit 25 shown in FIG. 33. In the adjusted light state sounding unit 33, a speaker control system 35 is connected to a sound data storage device (ROM) 34 and speaker 36. The speaker control system 35 is connected to the A/D converter 20 of FIG. 33.

The sound data storage device (ROM) 34 stores predetermined sound data in advance, such as "The light amount is 0%.", "The light amount is 50%.", and "The light amount is 100%. The light amount cannot be increased any more." The speaker control system 35 reads the sound data of the sound data storage device 34 by CPU (not shown) based on the digital signal from the A/D converter 20, and sets a speaker sounding level. The speaker 36 outputs the sound data read by the speaker control system 35 as sound.

In this configuration, when the observer rotates/operates the dimmer volume 13, the digital value outputted from the A/D converter 20 changes. In response to the output, the speaker control system 35 reads the sound data of the sound data storage device 34, and the speaker 36 outputs the sound.

Here, when the light amount of the LED 2 of the LED illumination unit 3 is the Min light amount, the speaker control system 35 reads the sound data "The light amount is 0%." from the sound data storage device 34, and the speaker 36 emits the sound data. When the light amount of the LED 2 is ½ light amount ((Max light amount−Min light amount)/2), the speaker control system 35 reads the sound data "The light amount is 50%." from the sound data storage device 34, and the speaker 36 emits the sound data. Furthermore, when the light amount of the LED 2 is Max light amount, the speaker control system 35 reads the sound data "The light amount is 100%. The light amount cannot increase any more." from the sound data storage device 34, and the speaker 36 emits the sound data as a message.

According to this configuration, the observer listens to the content of the sound message emitted from the speaker 36. Accordingly, even when the observer operates the dimmer volume 13 to perform the LED light adjustment, the observer can easily recognize the state of the LED light adjustment. When the light amount of the LED 2 is the Max light amount, the speaker 36 issues the warning of the shift to the dead band region by the message. Therefore, the warning property for the observer can be improved. In this case, when the message from the speaker 36 at the Max light amount time is repeatedly issued, the warning property can further be enhanced.

It is to be noted that in the eleventh embodiment, the adjusted light state sounding unit 33 is disposed instead of the adjusted light state display unit 25, but both the adjusted light state display units 25 and the adjusted light state sounding unit 33 may also be connected to the A/D converter 20. In this case, it is possible to confirm the state of the light amount visually and aurally. Especially, even when installation places of a microscope apparatus are excessively bright places, for example, under the scorching sun or very noisy places, a confirmation property of the state of the light amount is improved.

In the eleventh embodiment, the speaker 36 is used, but a buzzer may also be used instead. In this case, with the use of the buzzer, a buzzer control system is disposed instead of the speaker control system 35, and the sound data storage device 34 is unnecessary. The buzzer is constituted to ring only at the Max light amount time and not to ring in another state.

When the buzzer rings only at the Max light amount time in this manner, the warning of the shift to the dead band region in which the light amount of the illumination light by the LED 2 does not change can be issued to the observer. Therefore, the observer can grasp the dead band region in advance, and operability for the LED light adjustment can further be enhanced. Since the sound data storage device 34 is unnecessary, it is possible to reduce the cost.

It is to be noted that a buzzer sound emitted at the Max light amount time may continuously be emitted for a period of the Max light amount, or may also be emitted only for a given time at a time of the Max light amount reached from a state which is not the Max light amount.

Figure 42:
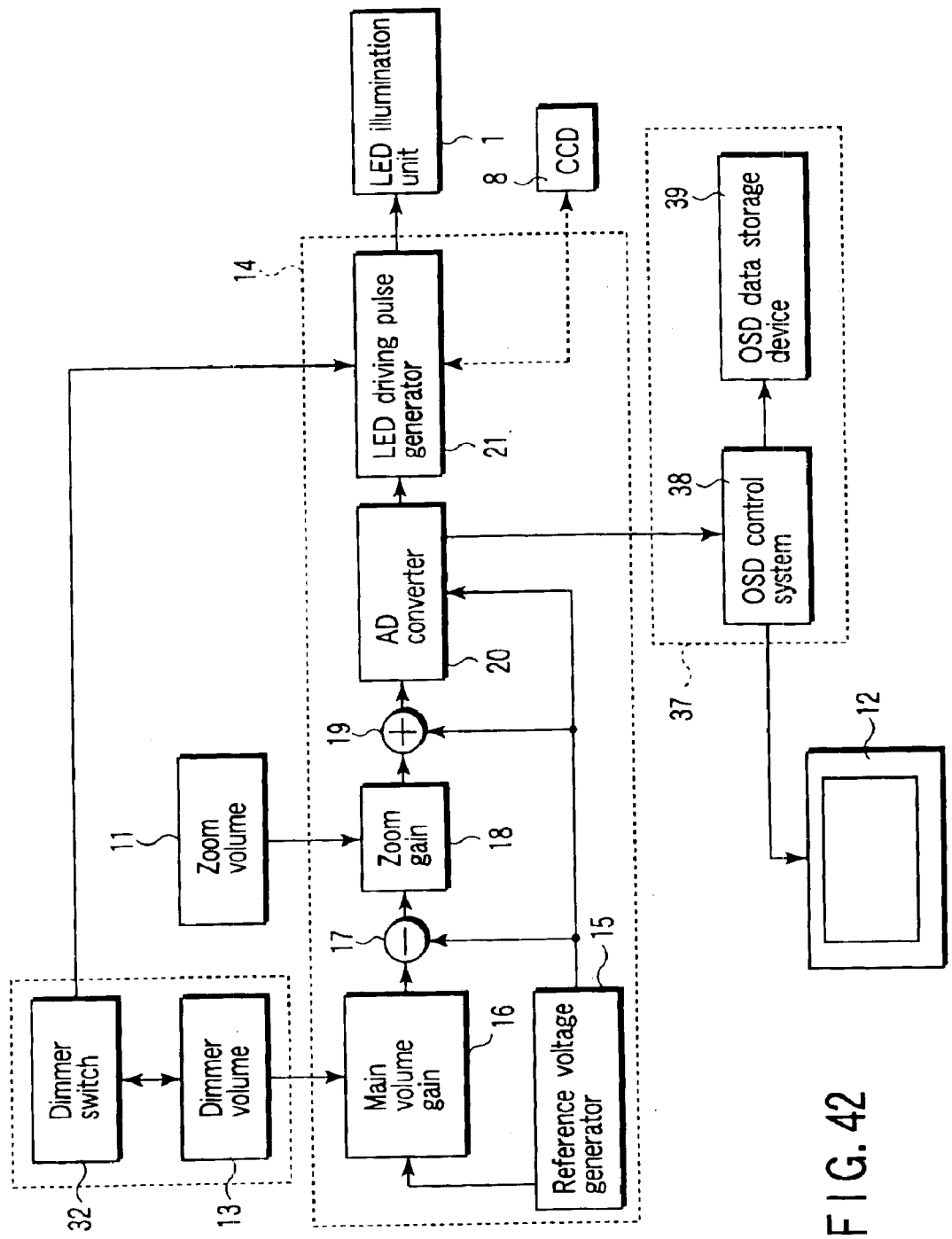
FIG. 42 is a block diagram concerning the light adjustment function of the microscope system according to a twelfth embodiment of the present invention.

FIG. 42 is a block diagram concerning the light adjustment function of the microscope system according to a twelfth embodiment of the present invention. In FIG. 42, the same components as those of FIG. 39 are denoted with the same reference numerals.

As shown in FIG. 42, the A/D converter 20 of the light adjustment control portion 14 is connected to an ON screen display (OSD means that information such as characters is superposed/displayed upon a monitor image) generator 37. The OSD generator 37 superposes/displays character information, and the like upon the monitor image of the monitor 12, and comprises an OSD control system 38 and OSD data storage device (ROM) 39. The OSD control system 38 is connected to the A/D converter 20, OSD data storage device 39, and monitor 12. The OSD control system 38 includes a CPU, program ROM, and the like (not shown). The OSD data storage device 39 stores the superposed/displayed information such as the characters as OSD data. The OSD data storage device 39 stores the character information such as "light amount: 0%", "light amount: 50%", "light amount: 100%" as the OSD data.

In this configuration, when the observer rotates/operates the dimmer volume 13, the digital value outputted from the A/D converter 20 is supplied to the OSD generator 37. In the OSD generator 37, the OSD control system 38 judges the adjusted light state corresponding to the digital value of the A/D converter 20, refers to the OSD data in the OSD data storage device 39 based on the result, and reads out the corresponding OSD data. Moreover, the OSD control system 38 sends the OSD data to the monitor 12, and superposes/displays the data as character information on the display image of the monitor 12.

Figure 43A:
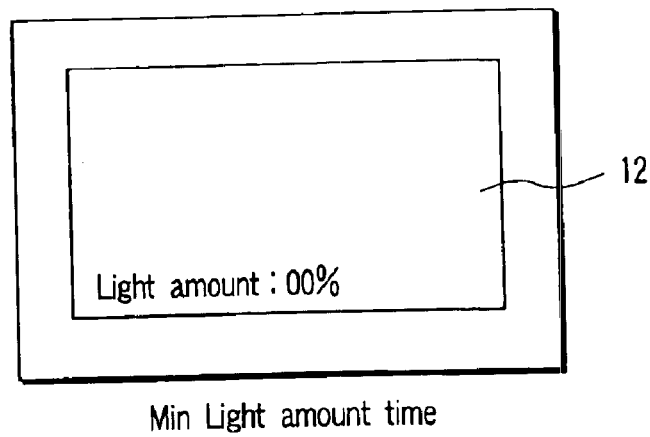
FIGS. 43A, 43B and 43C are diagrams showing display examples in a monitor according to the twelfth embodiment of the present invention.
Figure 43B:
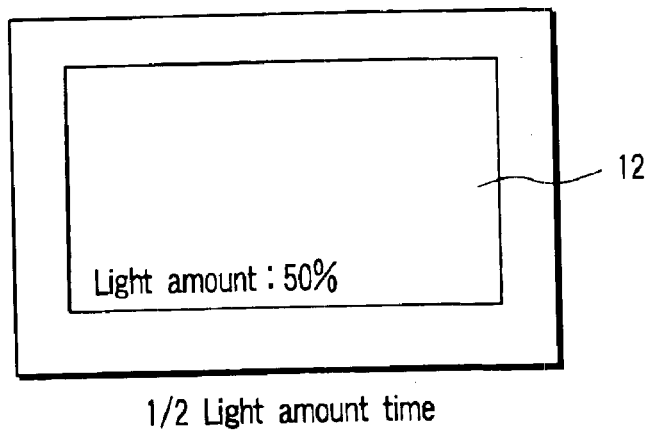
Figure 43C:
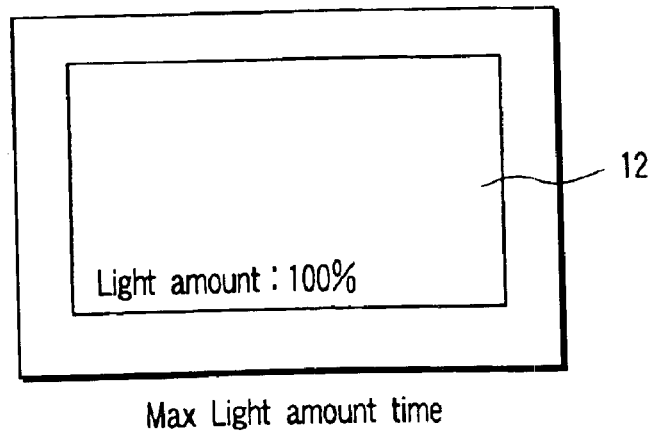

FIGS. 43A, 43B and 43C are diagrams showing display examples in the monitor 12. Here, when the light amount of the LED 2 of the LED illumination unit 3 is the Min light amount, as shown in FIG. 43A, "light amount: 00%" is displayed in the vicinity of a lower left part of the display image of the monitor 12. Moreover, when the light amount of the LED 2 is ½ light amount ((Max light amount−Min light amount)/2), as shown in FIG. 43B, "light amount: 50%" is displayed in the vicinity of the lower left part of the display image of the monitor 12. Furthermore, when the light amount of the LED 2 is the Max light amount, as shown in FIG. 43C, "light amount: 100%" is displayed in the vicinity of the lower left part of the display image of the monitor 12. The display of "light amount: 100%" has a character size larger than that of another display.

According to the configuration, the light amount state of the LED 2 can be displayed in the character information on the display image of the monitor 12. Therefore, even when the dimmer volume 13 is operated to perform the LED light adjustment, the state of the LED light adjustment can easily be recognized. When the light amount of the LED 2 is the Max light amount, the character information on the monitor 12 is enlarged and displayed to issue the warning of the shift to the dead band region, and therefore the warning property with respect to the observer can be enhanced.

It is to be noted that when the light amount of the LED 2 is the Max light amount, for example, "light amount: 100% The light amount cannot be increased any more." is displayed on the display image of the monitor 12. Then, the observer can more clearly be prompted to recognize a dead band region shift time.

According to the present invention, the following functions are produced.

(1) According to the present invention, the excitement pulse width into illuminating means is changed in synchronization with the driving pulse of the image pickup element, and the light adjustment control state of the controlled illumination light can instantly be informed with respect to the observer. Therefore, while constantly grasping the existing situation, the observer can perform the accurate light adjustment control.

(2) According to the present invention, the light amount state of the illumination light can be notified by the display in the display portion, the notification by the sound, and the superposed display onto the subject image. Therefore, optimum notification having high confirmation property can be performed in accordance with a use environment of the microscope.

(3) According to the present invention, the light adjustment dead band state in which the light amount of the illumination light does not change can be notified in advance. Therefore, the warning property to the observer with respect to the dead band region can be enhanced.

As described above, according to the present invention, there can be provided the microscope system in which the light amount state of the illumination light with the light adjustment control can be notified to the observer.

It is to be noted that the present invention is not limited to the above-described embodiments, and can variously be modified in a range not changing the scope in an implementation stage.

In the respective embodiments, the microscope system has been described above. However, in a viewpoint in which the light adjustment of the illumination light for observing the subject can be changed in accordance with an observation state with the simple operation, the present invention is not limited to the microscope system, and can also be adapted to various systems such as a line system in which the microscope apparatus is incorporated.

According to the present invention, there can be provided a microscope system in which color temperature does not change even with light adjustment performed in cooperation with an observation optical system and which is superior in operability at a low cost without being enlarged.

Moreover, according to the present invention, there can be provided a microscope system in which a light amount state of illumination light with light adjustment control can be notified to an observer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A microscope system comprising:
   an illuminating portion which illuminates a subject;
   an image forming lens which projects the subject illuminated by the illuminating portion onto an image pickup element;
   a light adjustment portion which adjusts a light amount of the illuminating portion;
   a zoom mechanism which changes a magnification of a subject image projected onto the image pickup element by the image forming lens; and
   a control portion which changes an excitement pulse width into the illuminating portion in synchronization with a driving pulse of the image pickup element in response to adjustment by the light adjustment portion to control the light amount of illumination light and which varies the excitement pulse width in accordance with the change of the magnification by the zoom mechanism.

2. The microscope system according to claim 1, wherein the control portion gives priority to adjustment by the light adjustment portion to control the light amount of the illumination light.

3. The microscope system according to claim 1, wherein the image pickup element is driven, even when the light amount of the illumination light is minimized by the light adjustment portion.

4. The microscope system according to claim 1, wherein the light adjustment portion can allow the excitement pulse width to be variable to maximum from minimum, and is integrated with a switch portion which stops excitation of the illuminating portion.

5. The microscope system according to claim 1, wherein the control portion changes the excitement pulse width in accordance with a rotation angle of the light adjustment portion.

6. The microscope system according to claim 1, wherein the control portion changes the excitement pulse width in accordance with a rotation angle of the zoom mechanism.

7. A microscope system comprising:
   an illuminating portion which illuminates a subject;
   an image forming lens which projects the subject illuminated by the illuminating portion onto an image pickup element;
   an illumination angle change mechanism which changes an illumination angle onto the subject by the illuminating portion;
   a light adjustment portion which adjusts a light amount of the illuminating portion;
   a zoom mechanism which changes a magnification of a subject image projected onto the image pickup element by the image forming lens;
   a control portion which changes an excitement pulse width into the illuminating portion in synchronization with a driving pulse of the image pickup element in response to adjustment by the light adjustment portion to control the light amount of illumination light and which varies the excitement pulse width in accordance with the change of the magnification by the zoom mechanism; and
   a maximum light amount indication portion which maximizes the light amount of the illumination light by control of the control portion irrespective of a state of the light adjustment portion.

8. The microscope system according to claim 7, wherein the illumination angle change mechanism moves the illuminating portion to a position on the same side as that of the image pickup element from a position disposed opposite to the image pickup element with respect to the subject.

9. The microscope system according to claim 8, wherein the illumination angle change mechanism is linked with the maximum light amount indication portion, and the control portion maximizes the light amount of the illumination light, when the illumination angle change mechanism moves the illuminating portion to a predetermined position.

10. The microscope system according to claim 7, wherein the control portion gives priority to control in accordance with the light adjustment portion rather than to control in accordance with the maximum light amount indication portion.

11. A microscope system comprising:

an illuminating portion which illuminates a subject;

an image forming lens which projects the subject illuminated by the illuminating portion onto an image pickup element;

a light adjustment portion which adjusts a light amount of the illuminating portion;

a zoom mechanism which changes a magnification of a subject image projected onto the image pickup element by the image forming lens;

a control portion which changes an excitement pulse width into the illuminating portion in synchronization with a driving pulse of the image pickup element in response to adjustment by the light adjustment portion to control the light amount of illumination light and which varies the excitement pulse width in accordance with the change of the magnification by the zoom mechanism; and a notification portion which notifies a state of the light amount of the illumination light in accordance with the excitement pulse width into the illuminating portion of the control portion.

12. The microscope system according to claim 11, wherein the notification portion displays the state of the light amount of the illumination light in accordance with the excitement pulse width into the illuminating portion.

13. The microscope system according to claim 11, wherein the notification portion converts the state of the light amount of the illumination light into sound in accordance with the excitement pulse width into the illuminating portion to notify the state.

14. The microscope system according to claim 11, wherein the notification portion superposes/displays the state of the light amount of the illumination light in accordance with the excitement pulse width into the illuminating portion onto the subject image picked up by the image pickup element.

15. The microscope system according to claim 11, wherein the notification portion warns/notifies a light adjustment dead band state in which the light amount of the illumination light controlled by the control portion does not change.

* * * * *